United States Patent
Versleegers et al.

(10) Patent No.: US 11,280,963 B2
(45) Date of Patent: Mar. 22, 2022

(54) OPTICAL FIBER CLAMP

(71) Applicant: COMMSCOPE CONNECTIVITY BELGIUM BVBA, Kessel-Lo (BE)

(72) Inventors: Jozef Christiaan Mathieu Versleegers, Bree (BE); Marc Eugène Willem Bervoets, Hasselt (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/642,779

(22) PCT Filed: Aug. 29, 2018

(86) PCT No.: PCT/EP2018/073213
§ 371 (c)(1),
(2) Date: Feb. 27, 2020

(87) PCT Pub. No.: WO2019/043049
PCT Pub. Date: Mar. 7, 2019

(65) Prior Publication Data
US 2021/0080651 A1    Mar. 18, 2021

Related U.S. Application Data

(60) Provisional application No. 62/551,452, filed on Aug. 29, 2017.

(51) Int. Cl.
*G02B 6/25* (2006.01)
*G02B 6/38* (2006.01)
*G02B 6/44* (2006.01)

(52) U.S. Cl.
CPC .............. *G02B 6/25* (2013.01); *G02B 6/4471* (2013.01); *G02B 6/3801* (2013.01); *G02B 6/3833* (2013.01)

(58) Field of Classification Search
CPC ...... G02B 6/25; G02B 6/3801; G02B 6/3833; G02B 6/4471
See application file for complete search history.

(56) References Cited

U.S. PATENT DOCUMENTS 4,202,475 A * 5/1980 Hirai ..................... C03B 37/16
225/2
4,618,084 A * 10/1986 Andrews ................. G02B 6/25
225/96

(Continued)

FOREIGN PATENT DOCUMENTS

| CN | 10464127 | 6/2015 |
|----|----------|--------|
| CN | 10628698 | 1/2017 |

(Continued)

OTHER PUBLICATIONS

International Search Report and Written Opinion of the International Searching Authority for International Patent Application No. PCT/EP2018/073213 dated Dec. 5, 2018, 14 pages.

*Primary Examiner* — Ryan A Lepisto
(74) *Attorney, Agent, or Firm* — Merchant & Gould P.C.

(57) ABSTRACT

A cleaving mechanism (20) and related method is adapted to cleave an optical fiber (10) and thereby produce a cleaved end on the optical fiber. The cleaving mechanism (20) includes a fixture (40), a cleave tool (60) for cleaving the optical fiber, and a clamp assembly (80). The clamp assembly (80) may hold the optical fiber without substantial twisting of the optical fiber (10). The fixture and/or the clamp assembly (80) may include a pair of leaf springs (92) that contact and bend around the optical fiber (10) to secure the optical fiber (10) in a clamped position.

18 Claims, 24 Drawing Sheets

(56) References Cited

U.S. PATENT DOCUMENTS

| | | | |
|---|---|---|---|
| 4,623,157 A | 11/1986 | Rohs | |
| 4,793,681 A * | 12/1988 | Barlow | G02B 6/3801 385/135 |
| 5,031,321 A * | 7/1991 | Briscoe | G02B 6/25 30/134 |
| 6,331,081 B1 | 12/2001 | Ohtsuka et al. | |
| 6,963,687 B2 | 11/2005 | Vergeest et al. | |
| 7,537,398 B2 | 5/2009 | Watte et al. | |
| 7,805,045 B2 | 9/2010 | Watte et al. | |
| 2008/0245836 A1* | 10/2008 | Murgatroyd | G02B 6/25 225/2 |
| 2014/0299645 A1 | 10/2014 | Lurie et al. | |
| 2015/0128779 A1 | 5/2015 | Zhao | |
| 2015/0177460 A1 | 6/2015 | Krechting et al. | |

FOREIGN PATENT DOCUMENTS

| | | |
|---|---|---|
| EP | 0 961 142 A1 | 12/1999 |
| EP | 1 853 953 B1 | 10/2009 |
| JP | S55-138706 A | 10/1980 |
| JP | H07-306333 A | 11/1995 |
| WO | 2005/017584 A1 | 2/2005 |
| WO | 2014009512 | 1/2014 |

* cited by examiner

OPTICAL FIBER CLAMP

CROSS-REFERENCE TO RELATED APPLICATION

This application is a National Stage Application of PCT/EP2018/073213, filed on Aug. 29, 2018, which claims the benefit of U.S. Patent Application Ser. No. 62/551,452, filed on Aug. 29, 2017, the disclosures of which are incorporated herein by reference in their entireties. To the extent appropriate, a claim of priority is made to each of the above disclosed applications.

TECHNICAL FIELD

The present disclosure relates to preparing optical fibers for joining to other optical fibers. In particular, the disclosure is related to preparing ends of optical fibers by cleaving.

BACKGROUND

Present day telecommunications technology utilizes, to an increasing extent, optical fibers for signal transmission. When preparing fiber optic networks, it is often necessary to join optical fibers together. The joining of the optical fibers can be accomplished by splicing or by connectorization.

To connect optical fibers, mechanical splicing can be used. Fiber ends of the optical fibers may be aligned and held together by a precision-made sleeve, often using a clear index matching material, such as an index matching gel, that enhances the transmission of light across the splice (i.e., the joint). Mechanical splicing may also be intended for a permanent connection, although in certain cases the fibers can still be disconnected and connected again afterwards. An example of a mechanical splicing system is disclosed in U.S. Pat. No. 7,537,398, the entirety of which is incorporated by reference herein. Before making a mechanical splice, the fibers are stripped of their coating, so that bare fiber ends are obtained. To obtain well-defined end faces that can subsequently be abutted in the mechanical splice, the ends are mechanically cleaved with a precision cleave tool, such as the one used in U.S. Pat. No. 7,805,045, the entirety of which is incorporated herein by reference.

If the fibers need to be connected, disconnected, reconnected, and/or "mated" several times, connectors may be used. An optical fiber connector is basically a rigid cylindrical barrel surrounded by a sleeve that holds the barrel in its mating socket. The mating mechanism can, for example, be "push and click", "turn and latch", etc. Good alignment of the connected optical fibers is extremely important in order to obtain a good quality connection with low optical signal losses. Usually, so called ferruled connectors are used, wherein the stripped fiber is positioned coaxially in a ferrule. Ferrules can be made of ceramic, metal, or sometimes plastic and have a drilled center hole. Ferruled connectors are expensive, however. The center hole has to be drilled very accurately for good alignment of the optical fiber. Further, the fiber's end face is polished, so that the fibers in the two ferruled connectors make good physical contact. The polishing step is expensive. Alternative alignment solutions, containing ferrule-less connectors, are much less expensive.

In ferrule-less arrangements, after both stripped fibers are cleaved mechanically, an optical end to end contact between both fibers may be established, possibly using index matching gel. The cleaved fibers may be inserted, without ferrules, into an alignment structure for alignment with each other, thus creating an optical transmission path. The alignment structure may, for example, include a V-groove. It has been observed that when ferrule-less, mechanically cleaved fibers are repeatedly connected and disconnected in an alignment structure, the connection and disconnection operation cannot be performed frequently before the quality of the optical connection decreases significantly.

An alternative for mechanical cleaving is laser cutting. U.S. Pat. No. 6,963,687 discloses a process for cutting an optical fiber by means of a laser. Very good results are achieved using a $CO_2$ laser (wavelength 10.6 µm) having a pulse length of 35 µs and a peak power of 600 watts. The laser cuts the fiber and polishes the end face of the fiber simultaneously. The laser-cut end face tends to have rounded edges rather than sharp edges; these rounded edges are better suited for alignment in a V-groove, since rounded edges glide along the V-groove whereas the sharp edges might potentially create debris in the optical path by their contact with the V-groove.

U.S. Pat. No. 6,331,081 discloses a connector and a method for making the connector, wherein one or more optical fibers are attached to the main body of the connector. One end face of each optical fiber is exposed and used as a connecting end face to another connector. The coating of each optical fiber is removed, so that the core (i.e., the central, light-transmitting region of the fiber and the cladding) is exposed. The end face of the thus exposed optical fiber is processed by spark discharging such that at least the front end of a core portion projects from the front end of a cladding portion. The thus processed optical fiber is then inserted into the main body of the connector and attached to it so that the end face projects from the connecting end face of the main body by a predetermined amount. In this way, a connection at a high accuracy can be established, particularly when using an optical fiber ribbon including a plurality of optical fibers and while establishing so-called physical contact (PC) to the optical fibers of the other connector by buckling the optical fibers.

JP 7-306333 describes a method for rounding edges of an end face of an optical fiber by heat treatment, chemical processing with an acid or the like, or physical processing with abrasive grains.

JP 55-138706 discloses a method in which the end face of an optical fiber is heated by an electric arc discharge so as to yield a rounded end face with a radius not smaller than the radius of the optical fiber.

Before splicing or connectorization of the optical fibers is performed, ends of the optical fibers are typically prepared. Various machines and devices have been disclosed that are designed to prepare the ends of the optical fibers. European Patent EP 1 853 953 and related U.S. Pat. No. 7,805,045, which are incorporated herein by reference in their entireties, give examples of such devices.

The overall quality of the joint joining two of the optical fibers together may be influenced by the quality of the preparation of the ends of the optical fibers.

A need still exists for an affordable and high quality method for mechanically connecting optical fibers.

SUMMARY

An aspect of the present disclosure relates to a clamping assembly for use in a cleaving assembly. The clamping assembly can include a frame and a clamping mechanism mounted to the frame. The clamping mechanism can include a pair of oppositely facing leaf springs between which an optical fiber can be clamped, a first clamping member in contact with one of the leaf springs, and a second clamping member in contact with the other of the leaf springs. When a clamping force is applied to one or both of the first and second clamping members, the leaf springs contact the optical fiber and bend about the optical fiber.

In one example, a clamping mechanism is disclosed having a pair of deflectable members between which an optical fiber can be clamped, wherein when a clamping force is applied to one or both of the pair of deflectable members, the clamping members contact the optical fiber and deflect about the optical fiber.

In some examples, the deflectable members are leaf springs.

In some examples, a pair of clamping members in contact with the pair of deflectable members is provided.

In some examples, the clamping members each have a pair of contact members separated by a central recess, the contact members being in surface contact with the deflectable members.

In some examples, an actuator generates a clamping force between the pair of deflectable members.

In some examples, a biasing member is provided that generates a biasing force to separate the pair of deflectable members.

In some examples, the clamping assembly includes a spring for biasing the second clamping member towards the second clamping member to generate the clamping force and to place the clamping mechanism in a clamped position.

In some examples, the clamping assembly includes an actuator for retracting the second clamping member away from the first clamping member to place the clamping mechanism in an unclamped position.

In some examples, the actuator is a voice coil.

In some examples, the first and second clamping members each defines a pair of contact members separated by a recess area.

In some examples, the recess areas each have a width that is greater than a diameter of the optical fiber.

In some examples, the first clamping member is held in a rigid position and the second clamping member is movable to place the clamping mechanism in either the clamped position or the unclamped position.

In some examples, the second clamping member is received by and translates within an aperture of a support block.

In some examples, the support block is rigidly connected to the first clamping member.

In some examples, the support block and the first clamping member are aligned together by at least two alignment pins.

In some examples, the frame includes a first part and a second part flexibly connected to the first part.

In some examples, the clamping mechanism is rigidly mounted to the second part and the first part is rigidly mounted to another structure.

In some examples, the clamping assembly includes an actuator extending between the first and second parts, wherein when the actuator is actuated, the second part and the clamping mechanism is moved relative to the first part.

In some examples, the clamping assembly includes a sensor for measuring a distance that the first part is moved relative to the first part by the actuator.

A method for cleaving an optical fiber is also disclosed. The method can include the steps of: providing the optical fiber, holding the optical fiber with a fixture at a first location of the optical fiber, clamping the optical fiber with a clamp at a second location of the optical fiber without substantial twisting of the optical fiber between the first and the second locations due to leaf springs of the clamp contacting and bending around the optical fiber, and cleaving the optical fiber between the first and the second locations of the optical fiber with a cleave tool.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

According to the principles of the present disclosure, an optical fiber cleaving mechanism includes a clamping system that substantially eliminates axial twisting of an optical fiber that is cleaved by the optical fiber cleaving mechanism and that also reduces the likelihood of the optical fiber being damaged during the clamping process. By substantially eliminating the axial twisting of the optical fiber when clamping while also allowing springs of the clamp to deflect around the optical fiber, an improved cleaved end is formed on the optical fiber when the optical fiber is cleaved in comparison to cleaved ends formed on optical fibers by prior art optical fiber cleaving mechanisms that include prior art clamping systems. An improved optical joint may result when using one or two of the improved cleaved ends formed on one or two of the optical fibers of the optical joint. Any twisting of the optical fiber by the clamp may be limited to a predetermined limit. In certain embodiments, the predetermined limit may be less than about 200 degrees per meter of optical fiber length. In other embodiments, the predetermined limit may be less than about 100 degrees per meter of optical fiber length. In still other embodiments, the predetermined limit may be less than about 50 degrees per meter of optical fiber length.

Figure 1:
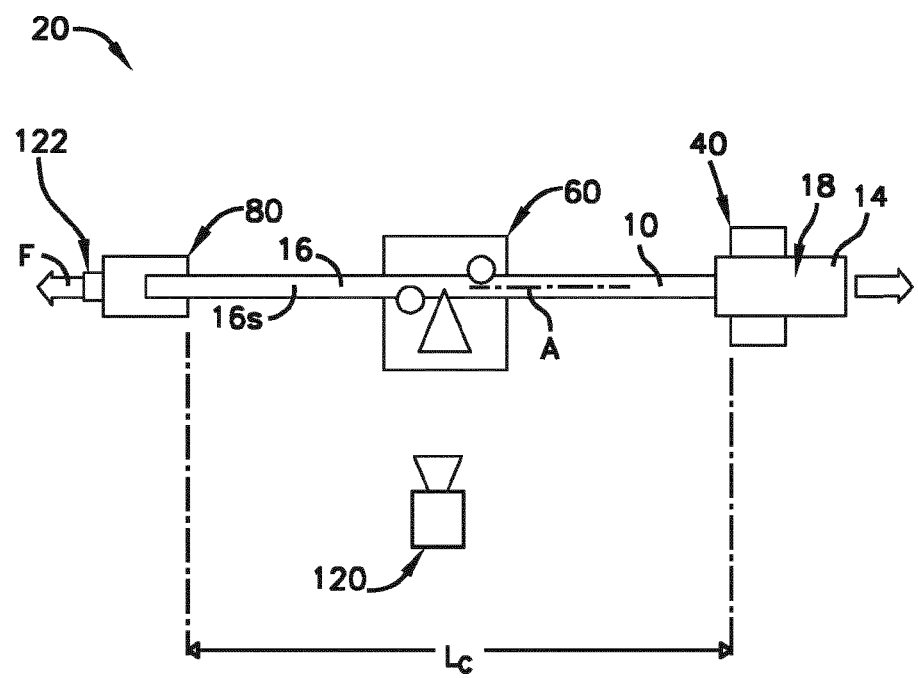
FIG. 1 is a schematic illustration of a fiber optic cleaving mechanism according to the principles of the present disclosure.

According to the principles of the present disclosure, an example cleaving system 20 includes a fixture 40, a cleave tool 60, a clamp mechanism 80, and a tensioner 122, as illustrated at FIG. 1. In certain embodiments, the cleaving system 20 may include a vision system 120. Methods of using the cleaving system 20 generally follow the disclosure given at EP 1 853 953 and related U.S. Pat. No. 7,805,045, which were incorporated by reference above. The features and methods disclosed herein are generally adaptable to cleaving mechanisms and related methods disclosed at EP 1 853 953 and U.S. Pat. No. 7,805,045. In addition to the features and methods disclosed herein, refer to EP 1 853 953 and U.S. Pat. No. 7,805,045 for details and background on cleaving and splicing optical fibers.

Figure 2:
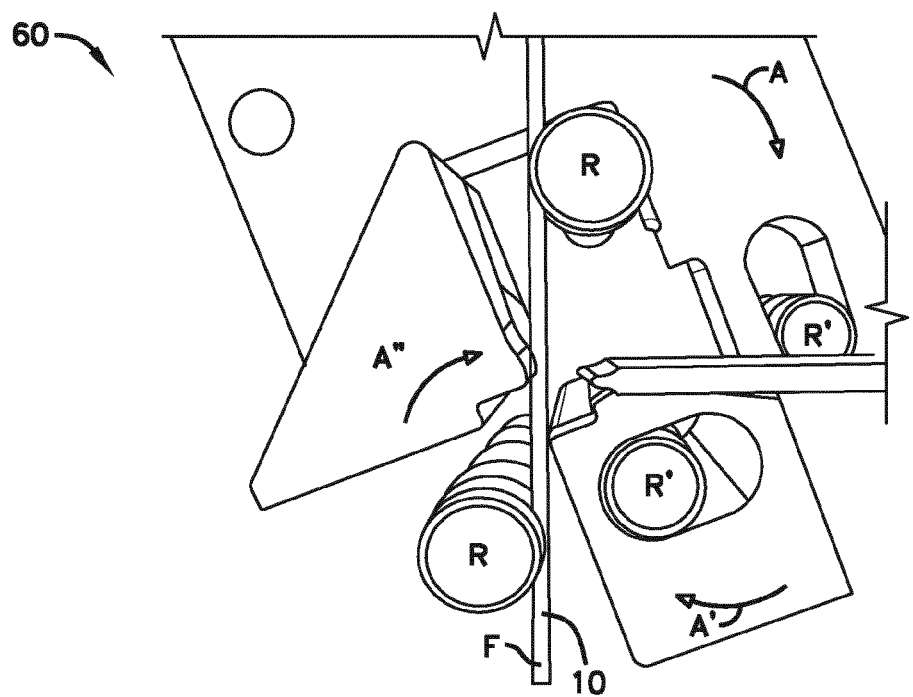
FIG. 2 is a partial perspective view of a cleaving tool of the fiber optic cleaving mechanism of FIG. 1.
Figure 3:
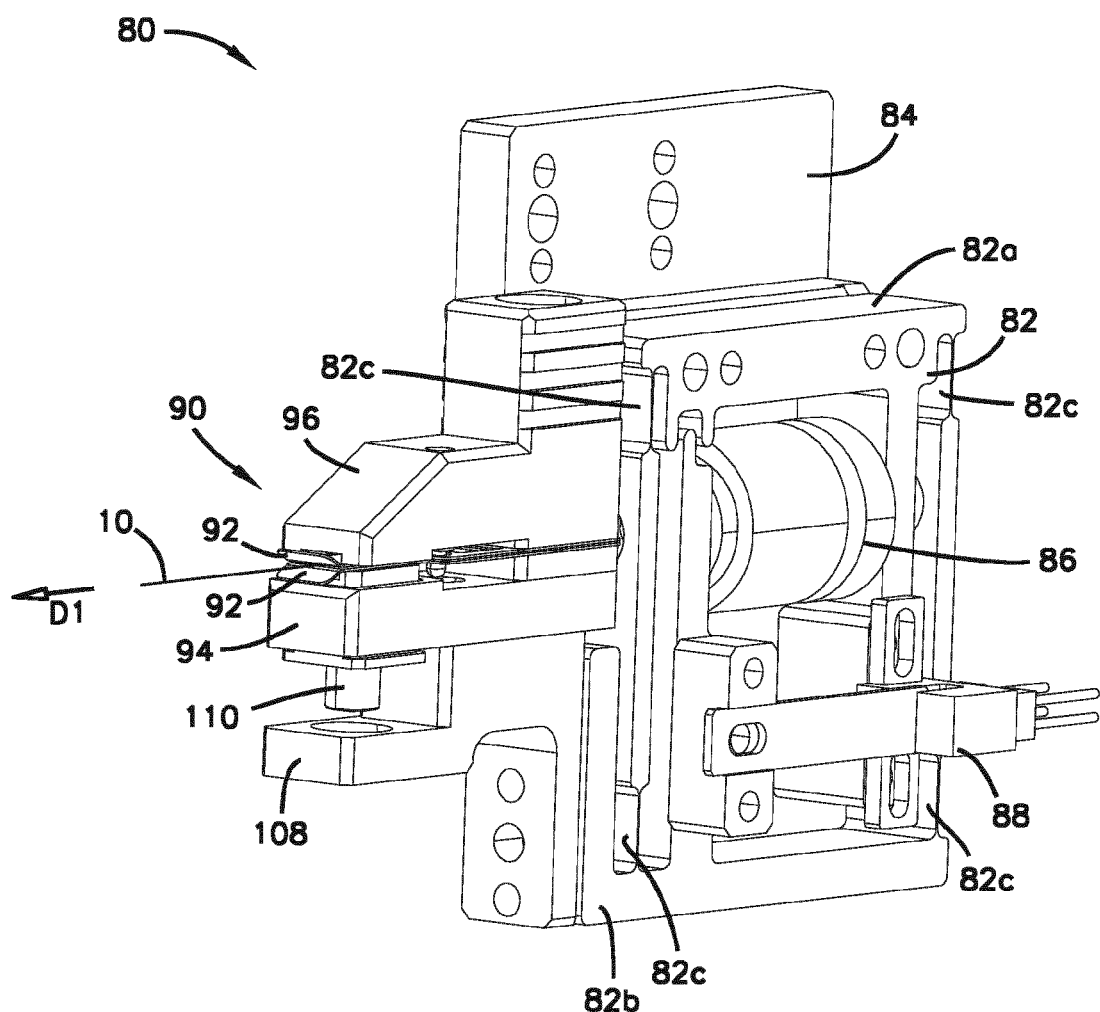
FIG. 3 is a perspective view of a clamping mechanism of the fiber optic cleaving mechanism of FIG. 1.
Figure 4:
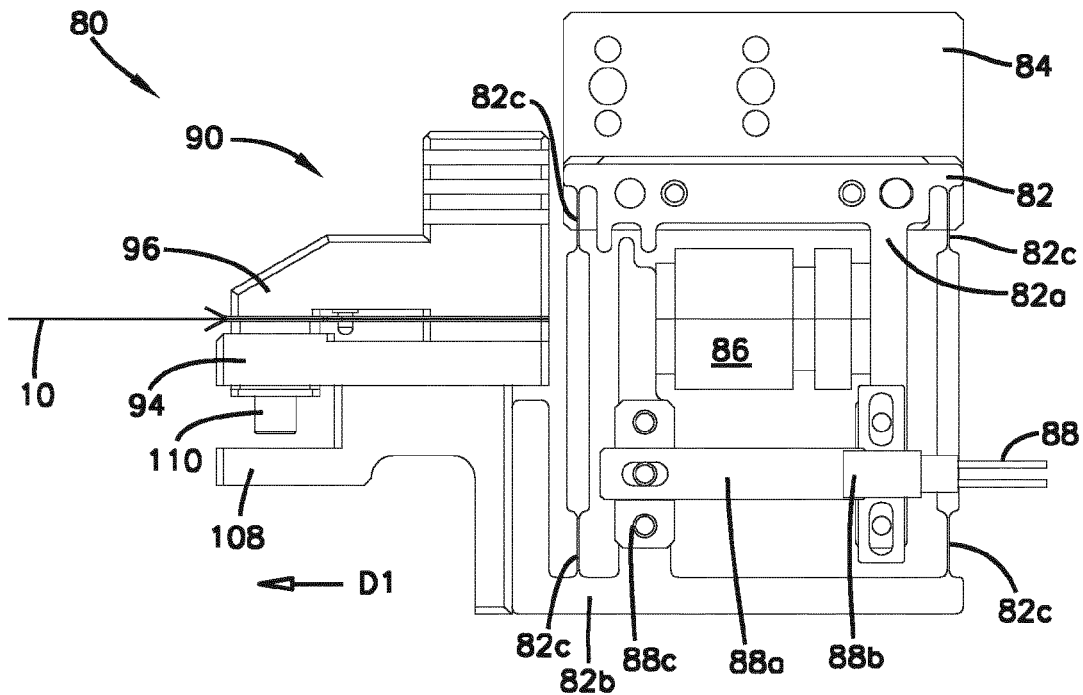
FIG. 4 is a first side view of the clamping mechanism shown in FIG. 3.
Figure 5:
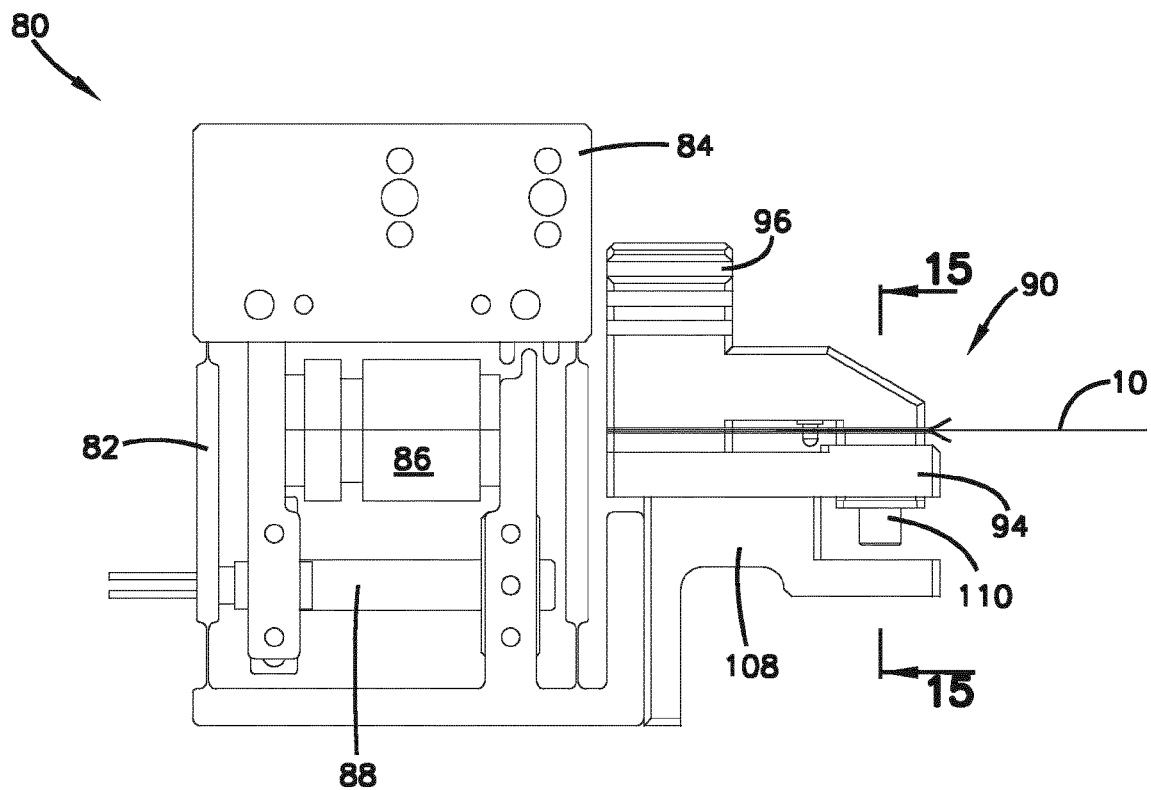
FIG. 5 is a second side view of the clamping mechanism shown in FIG. 3.
Figure 6:
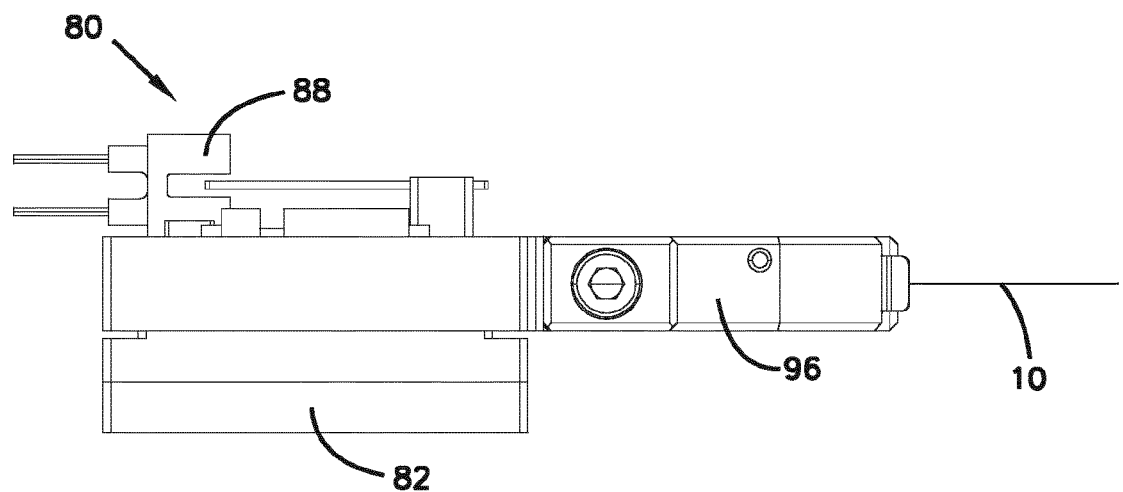
FIG. 6 is a top view of the clamping mechanism shown in FIG. 3.
Figure 7:
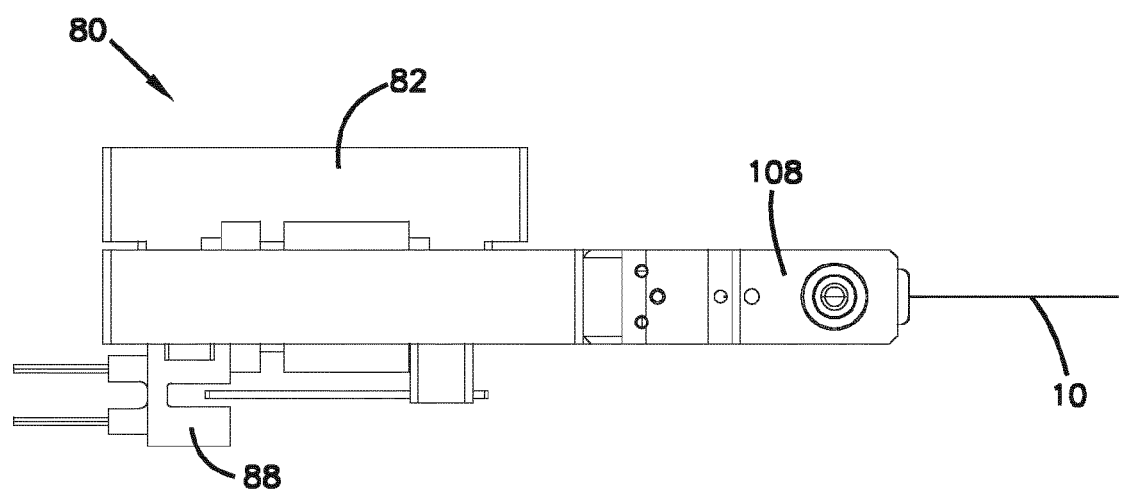
FIG. 7 is a bottom side view of the clamping mechanism shown in FIG. 3.
Figure 8:
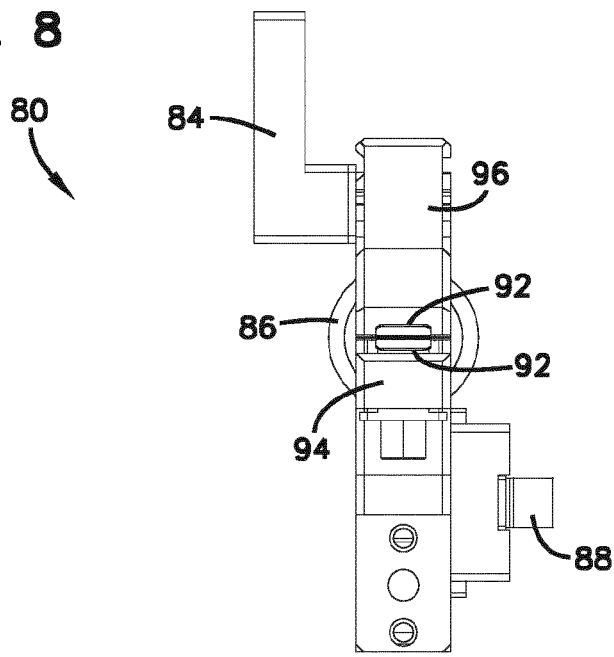
FIG. 8 is a first end view of the clamping mechanism shown in FIG. 3.
Figure 9:
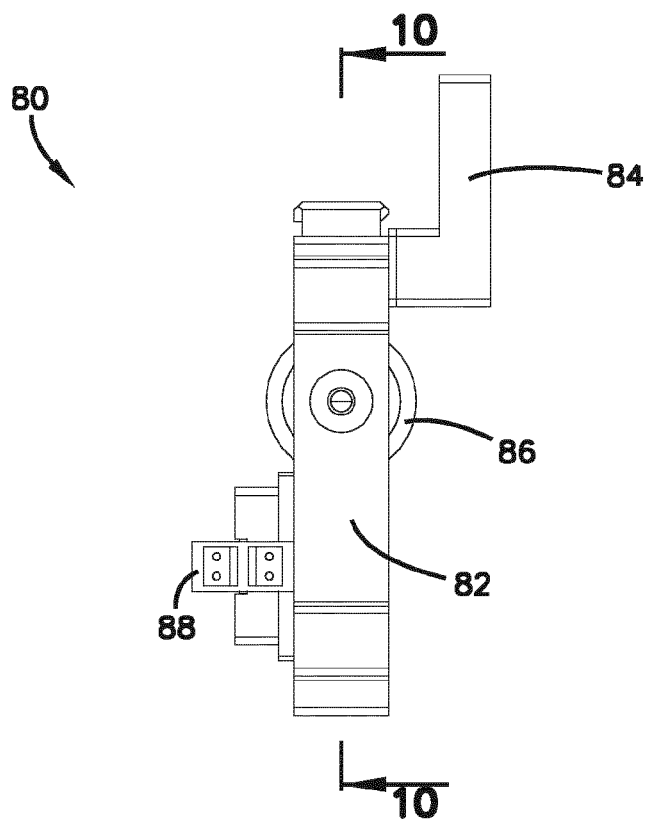
FIG. 9 is a second end view of the clamping mechanism shown in FIG. 3.
Figure 10:
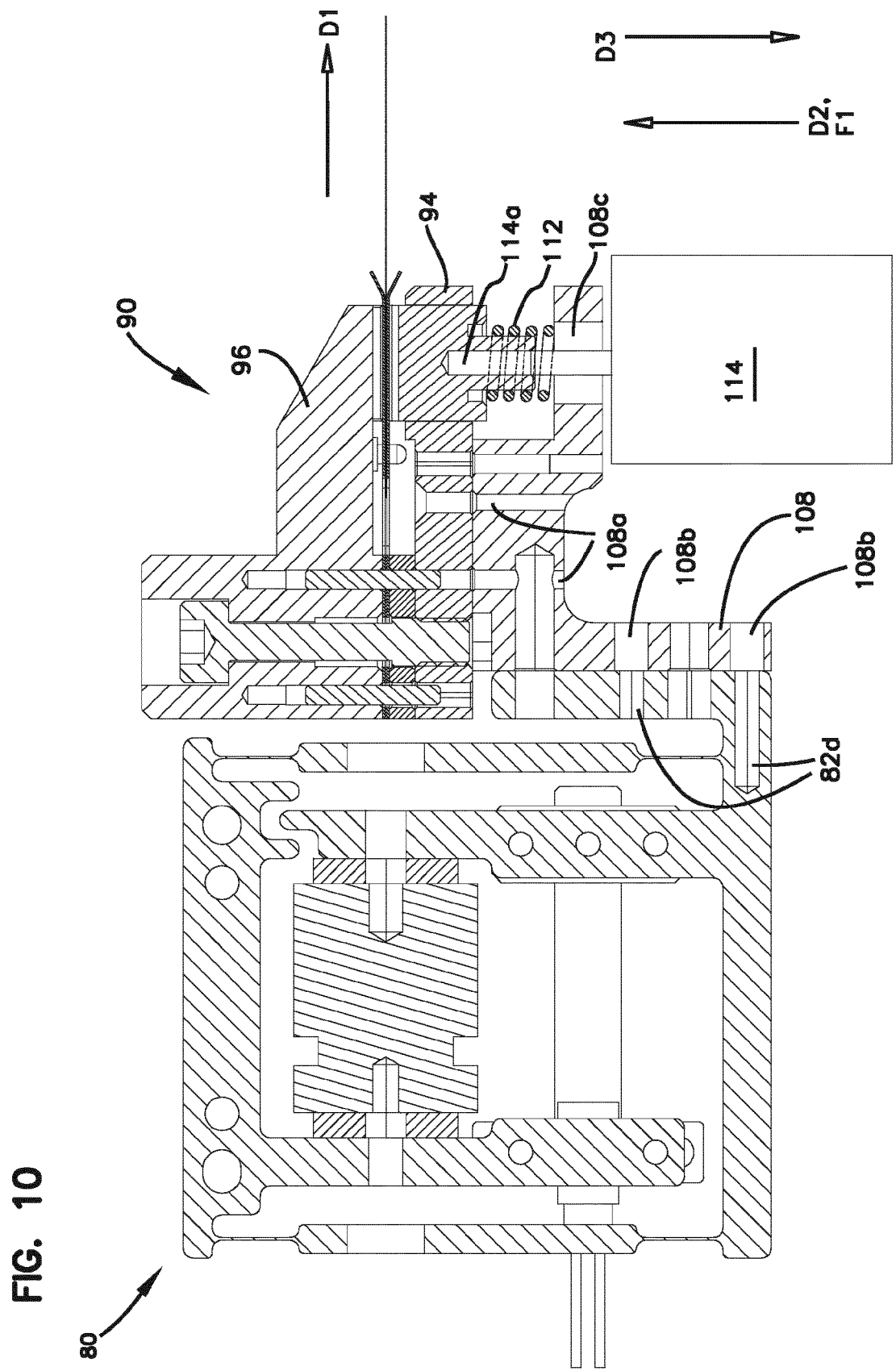
FIG. 10 is a cross-sectional side view of the clamping mechanism shown in FIG. 3.

A method of cleaving an optical fiber 10, and thereby forming a cleaved end 12 on the optical fiber 10, may include stripping a protective coating 14 off of an end portion 16 of a fiber optic cable 18, thereby forming a stripped end portion 16s (see FIG. 1). The stripped end portion 16s may be placed in the cleaving system 20. In particular, the stripped end portion 16s may be placed within the cleave tool 60 (see FIG. 2) and the clamp mechanism 80. In certain embodiments, the stripped end portion 16s may also be placed within the fixture 40. In other embodiments, including the embodiment illustrated at FIG. 1, the fiber optic cable 18, including the protective coating 14, may be placed within the fixture 40. Upon placing the fiber optic cable 18 and/or the optical fiber 10 within the cleaving system 20, the fiber optic cable 18 and/or the optical fiber 10 may be clamped or otherwise secured to the fixture 40. Upon the fiber optic cable 18 and/or the optical fiber 10 being secured to the fixture 40, the clamp mechanism 80 may be actuated and thereby secured to the stripped end portion 16s of the optical fiber 10. Upon the stripped end portion 16s of the fiber optic cable 18 being secured by the clamp mechanism 80, the tensioner 122 may apply tension to the fiber optic cable 18 and/or the optical fiber 10 between the fixture 40 and the clamp mechanism 80. Upon tension being applied to the fiber optic cable 18 and/or the optical fiber 10, the cleave tool 60 may be actuated and thereby cleave the optical fiber 10 thereby producing a cleaved end.

In certain embodiments, the cleaved end may be formed generally perpendicular to an axis A of the optical fiber 10. In certain embodiments, the cleaved end may be formed at a cleaving angle α from perpendicular to the axis A. In embodiments with the cleaved end formed at the cleaving angle α, the cleaved end may be abutted with another cleaved end to form a mechanical splice joint. In certain embodiments, the mechanical splice joint may be finished without polishing of the cleaved ends. In certain embodiments, the mechanical splice joint may be finished without fusing (i.e., melting together) the cleaved ends.

As illustrated at FIG. 1, the fixture 40 may be spaced from the clamp mechanism 80 by a distance $L_C$. In certain embodiments, the distance $L_C$ may range from about 40 millimeters to about 50 millimeters. The selection of the distance $L_C$, in part, determines the degree of twisting of the optical fiber 10 per unit length. For example, with the distance $L_C$ set to 50 millimeters and a twist angle β of the optical fiber 10 between the fixture 40 and the clamp mechanism 80 of 10 degrees, the amount of twist per unit length of the optical fiber 10 may be $\beta/L_C$=10 degrees/0.05 meter=200 degrees per meter of optical fiber length. The degree of twisting of the optical fiber 10 per unit length is thus reduced by increasing the distance $L_C$ and/or by reducing the twist angle β of the optical fiber 10 between the fixture 40 and the clamp mechanism 80. In certain embodiments, the cleave tool 60 may depend upon the fixture 40 and/or the clamp mechanism 80 to support the optical fiber 10 for proper operation. Thus, the distance $L_C$ cannot be arbitrarily increased, in certain embodiments. Furthermore, increasing the distance $L_C$ may increase an overall size of the cleaving system 20. In certain embodiments and especially in portable embodiments, an increase in the overall size of the cleaving system 20 is undesired. As will be explained in detail below, reducing the twist angle β of the optical fiber 10 between the fixture 40 and the clamp mechanism 80 may be achieved by the improved clamp mechanism 80, according to the principles of the present disclosure.

As mentioned in the references EP 1 853 953 and U.S. Pat. No. 7,805,045, other operations and/or components may be included in the cleaving of the optical fiber 10. For example, the optical fiber 10 may be scored by the activation of the cleaving. When a fiber under tension is scored, a crack is initiated that will grow rapidly, resulting in completely cleaving the fiber.

Figure 11:
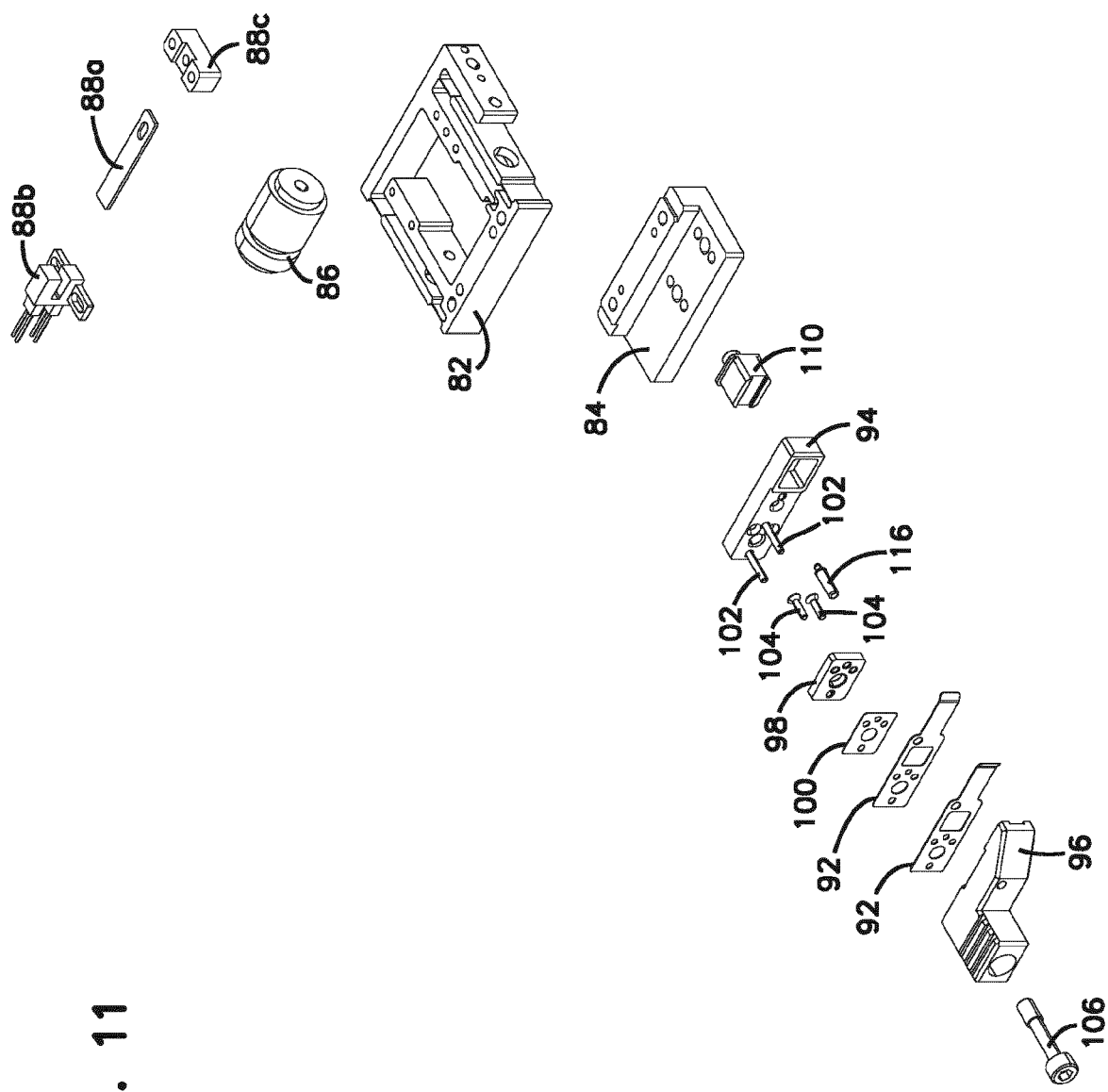
FIG. 11 is an exploded perspective view of the clamping mechanism shown in FIG. 3.
Figure 12:
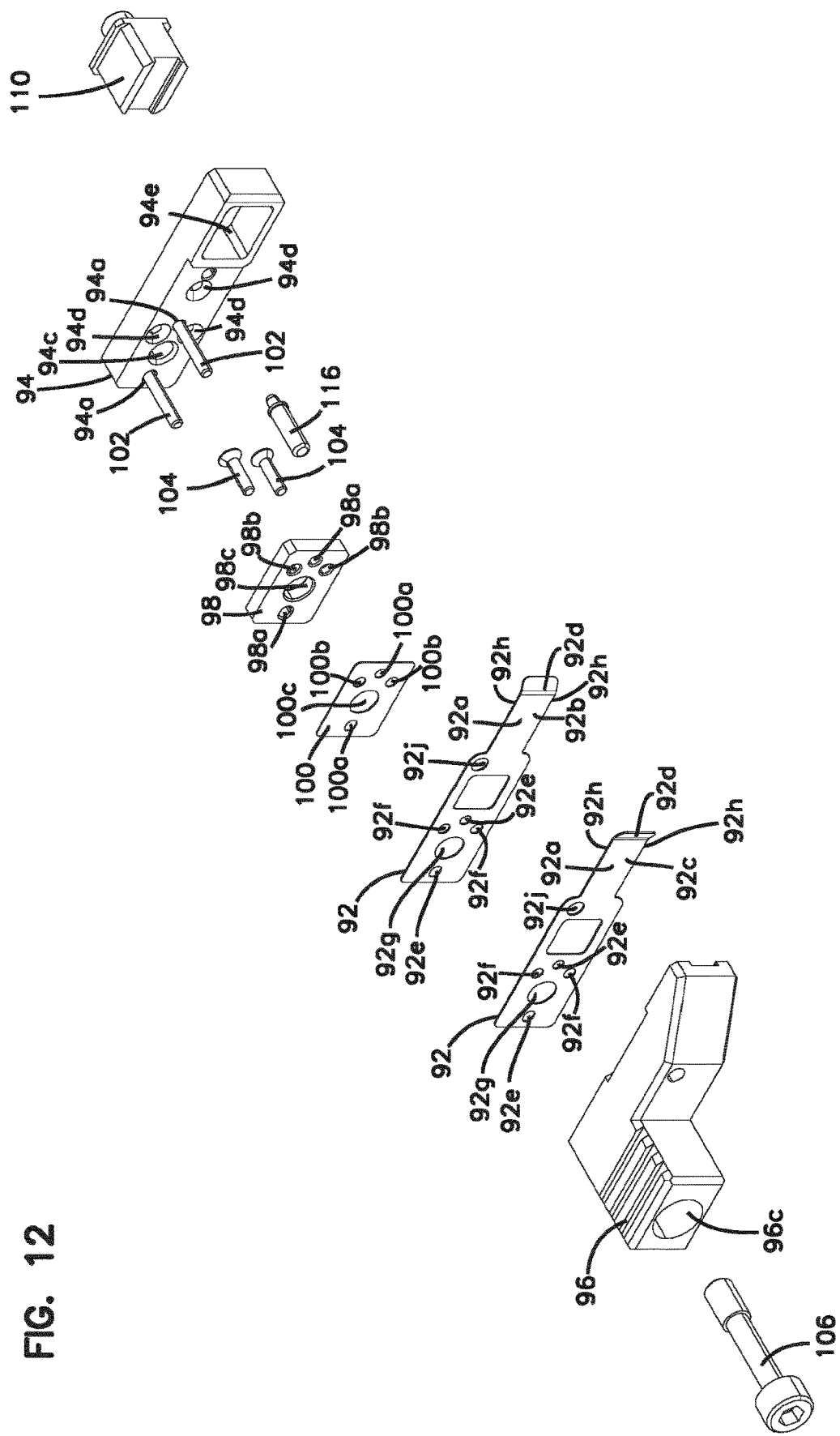
FIG. 12 is an exploded perspective view of a portion of the clamping mechanism shown in FIG. 3.
Figure 13:
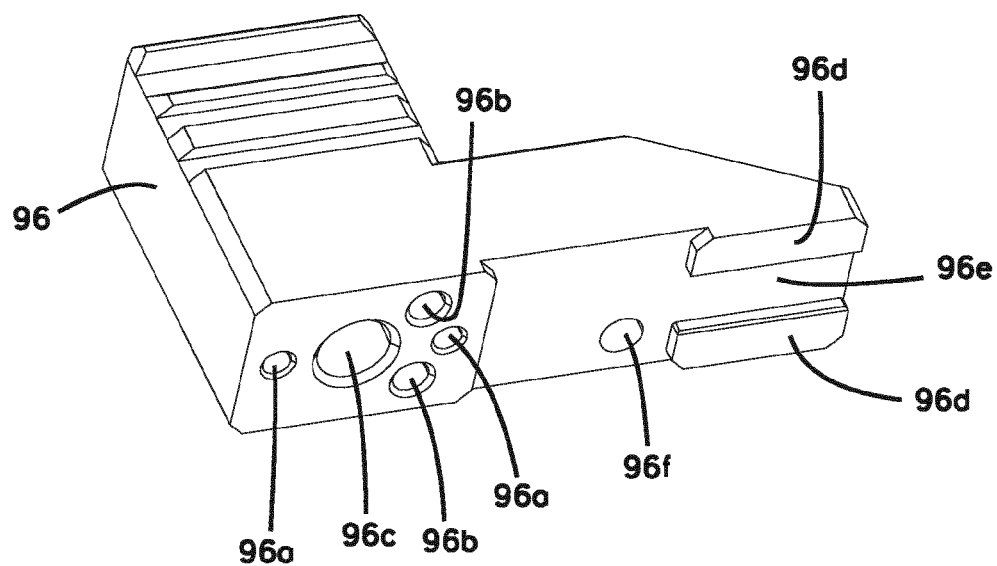
FIG. 13 is a perspective view of an upper block of the clamping mechanism shown in FIG. 3.
Figure 14:
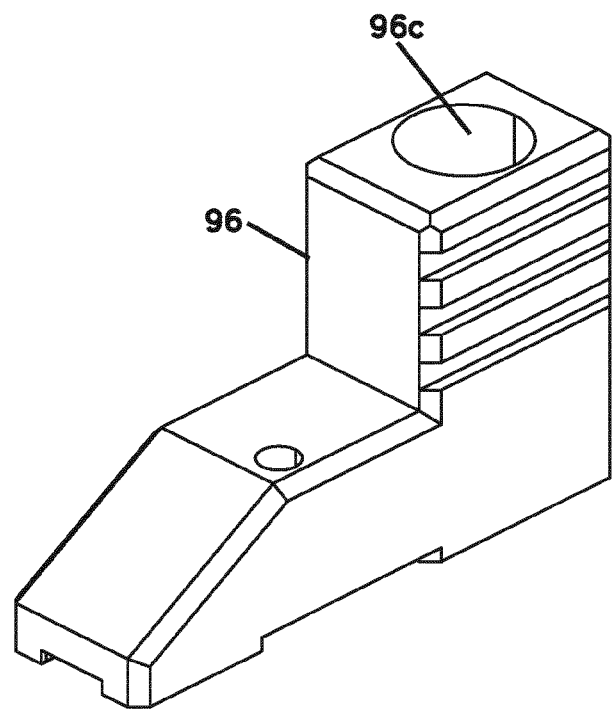
FIG. 14 is a bottom perspective view of the upper block shown in FIG. 13.
Figure 15:
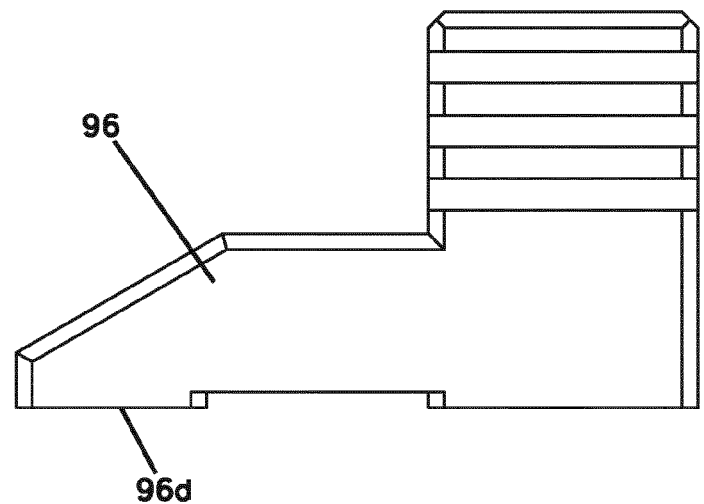
FIG. 15 is a side view of the upper block shown in FIG. 3.
Figure 16:
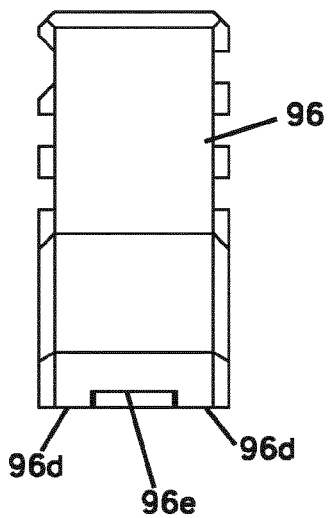
FIG. 16 is an end view of the upper block shown in FIG. 13.
Figure 38:
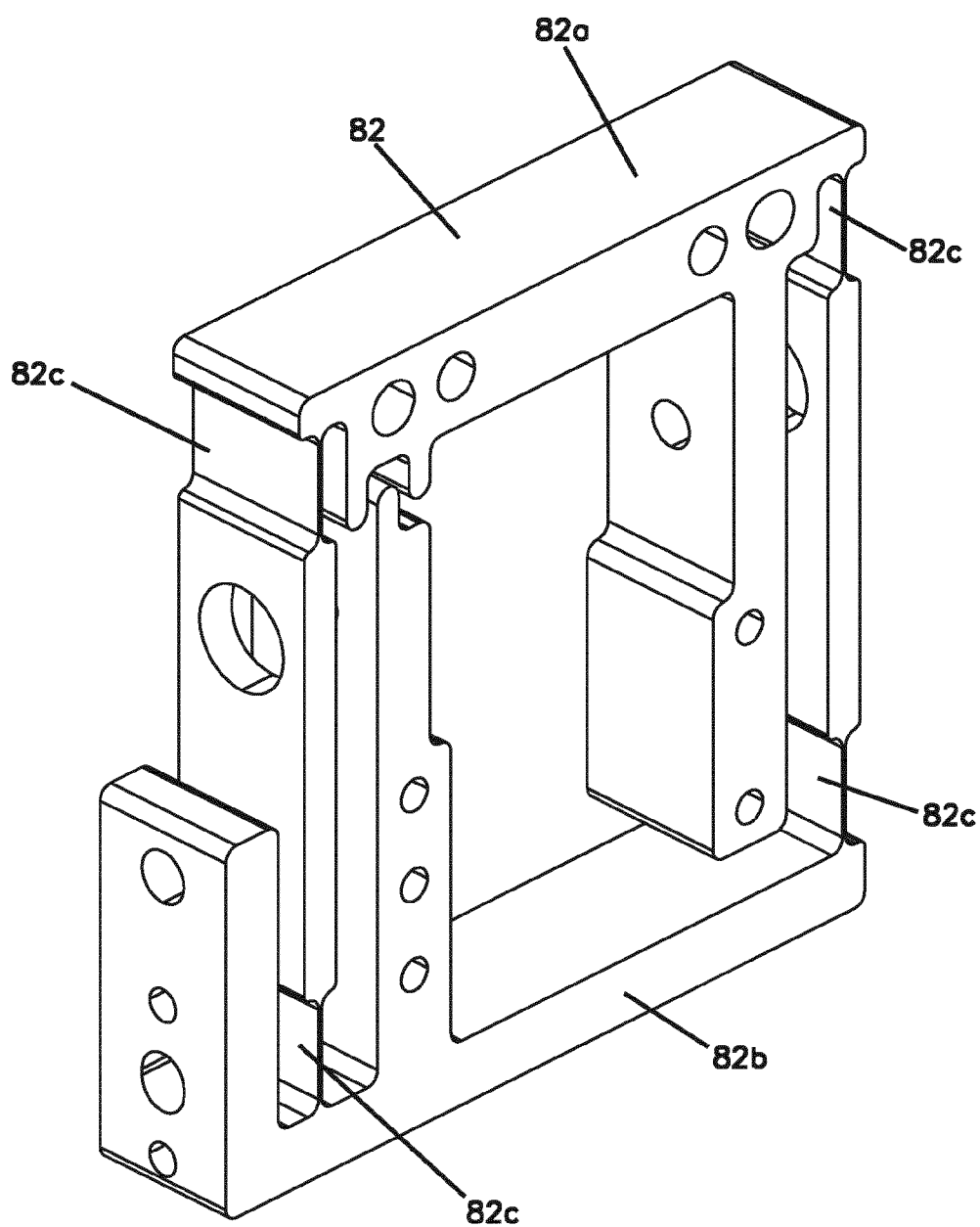
FIG. 38 is a perspective view of a frame member of the clamping device shown in FIG. 3.
Figure 39:
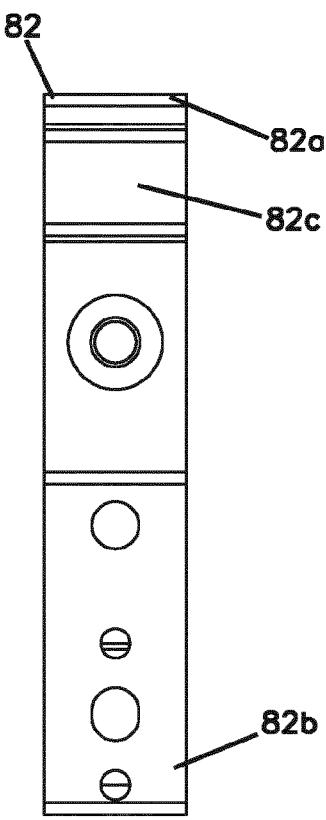
FIG. 39 is an end view of the frame member shown in FIG. 38.
Figure 40:
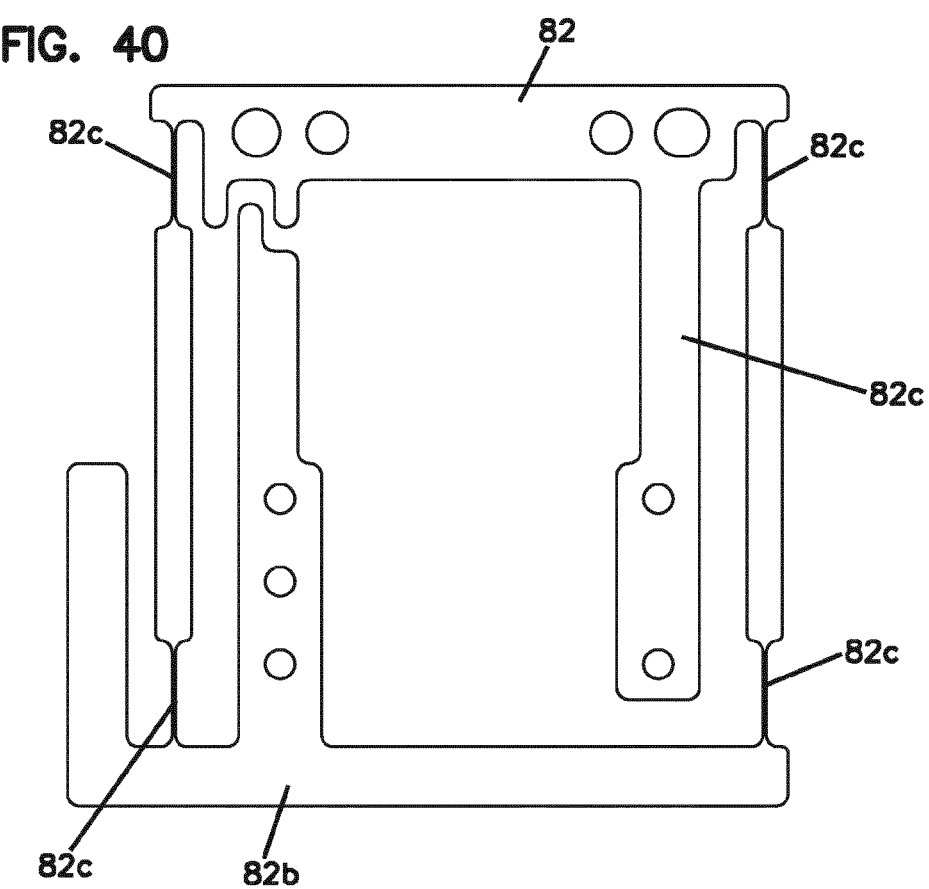
FIG. 40 is a side view of the frame member shown in FIG. 35.

Turning now to FIGS. 3-43, the clamping mechanism 90 will be described in detail. The clamping mechanism 90 is shown as being fully assembled in FIGS. 3-10 while FIGS. 11 and 12 shown an exploded view. In one aspect, the clamping mechanism 90 includes a frame member 82 and a mounting member 84, the mounting member 84 being for securely mounting the frame member 82 to a larger support frame. The frame member 84 is shown in isolation at FIGS. 38-40. In one aspect, the frame member 82 includes a first portion 82a and a second portion 82b interconnected by flexible portions 82c. The first portion 82a is rigidly secured to the mounting member 84 and the second portion supports a clamping assembly 80. Spanning between the first and second portions 82a and 82b is an actuator 86, for example an electric actuator such as a voice coil. When activated, the actuator 86 forces the section portion 82b in a direction D1, which is enabled by the flexible portions 82c. This action, which is performed after the clamping assembly 80 clamps the optical fiber 10 in place, allows the clamping mechanism 90 to impart a desired level of tension into the optical fiber 10 for the above described cleaving process. A sensor 88, for example an optical sensor, is also shown as being provided and includes a first member 88a and a sensing member 88b. The first member 88a is attached to the second portion 82b of the frame member 82 via a mounting member 82c while the sensing member 88b is attached to the first portion 82a. As the actuator 86 is activated, the sensing member 88b can sense the degree to which the first member 88a has moved, which can be used to determine the degree to which the optical fiber is being tensioned in the direction D1. Thus, a control system (not shown), can actuate the actuator 86 based on feedback from the sensor 88 to achieve a predetermined displacement or tensioning of the optical fiber 10.

Figure 29:
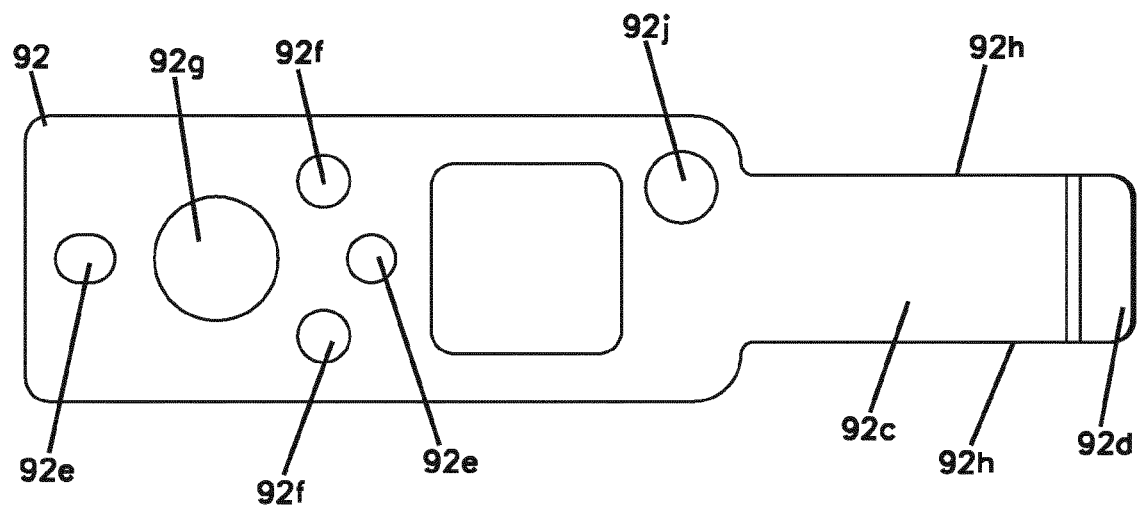
FIG. 29 is a top view of a leaf spring of the clamping mechanism shown in FIG. 25.
Figure 30:
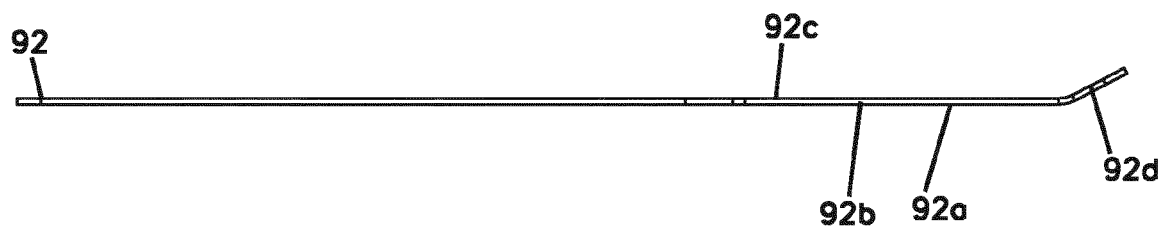
FIG. 30 is a side view of the leaf spring shown in FIG. 29.
Figure 31:
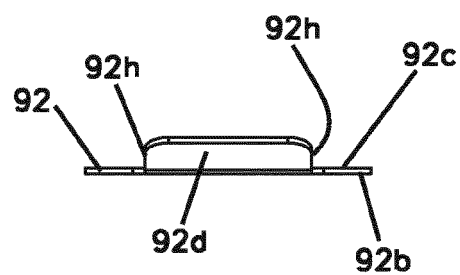
FIG. 31 is an end view of the leaf spring shown in FIG. 29.
Figure 32:
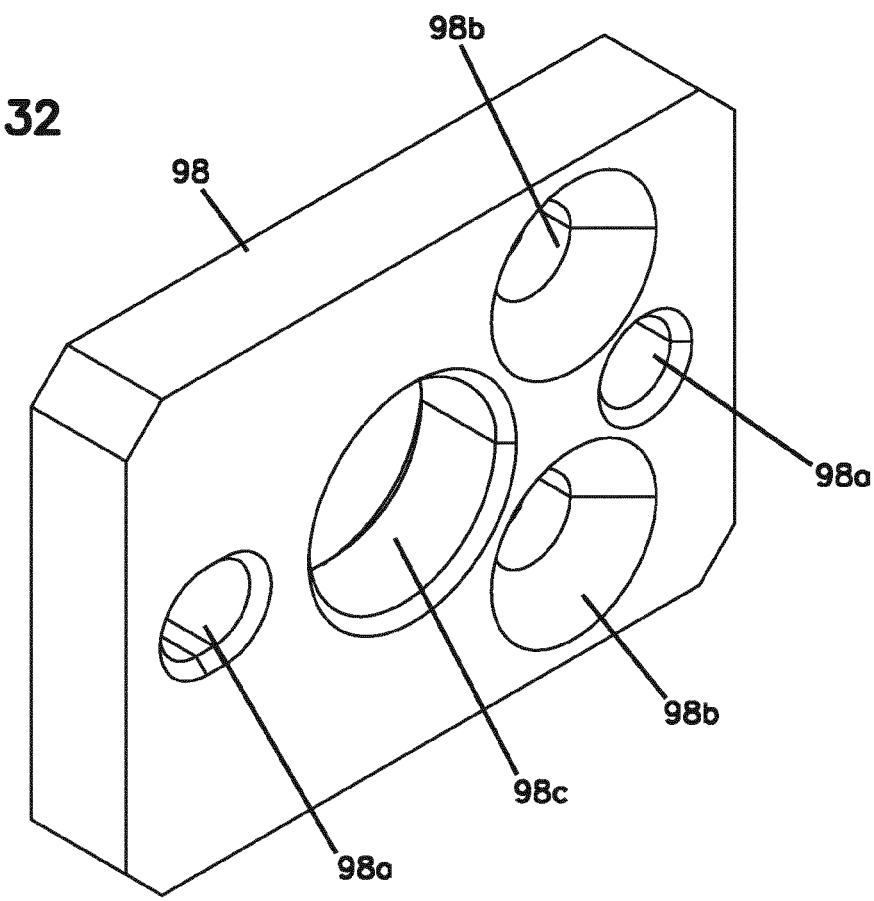
FIG. 32 is a first perspective view of a spacer block of the clamping device shown in FIG. 3.
Figure 33:
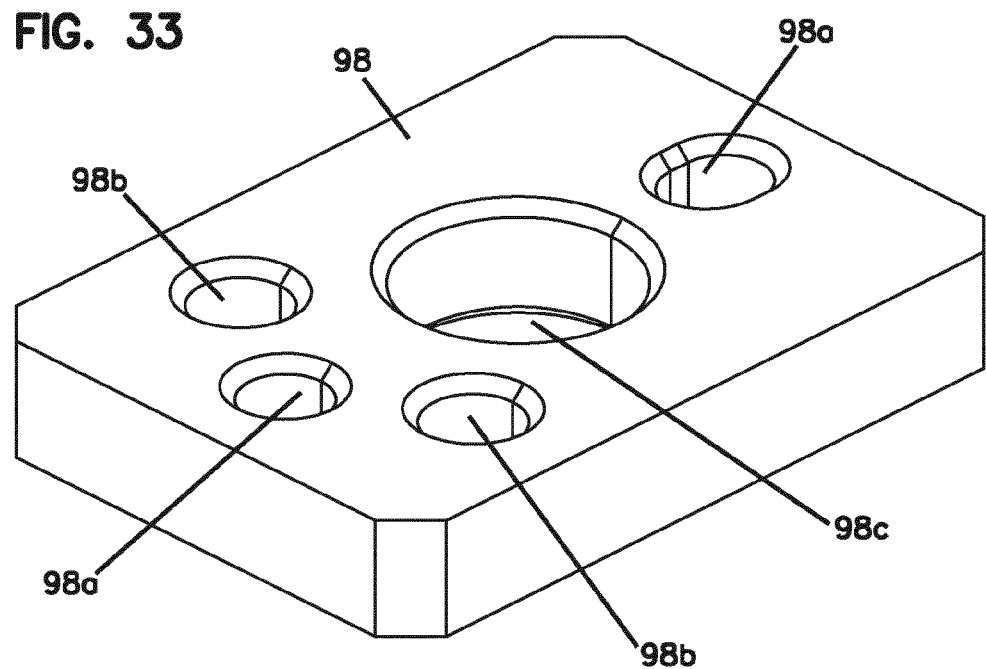
FIG. 33 is a second perspective view of the spacer block shown in FIG. 32.
Figure 34:
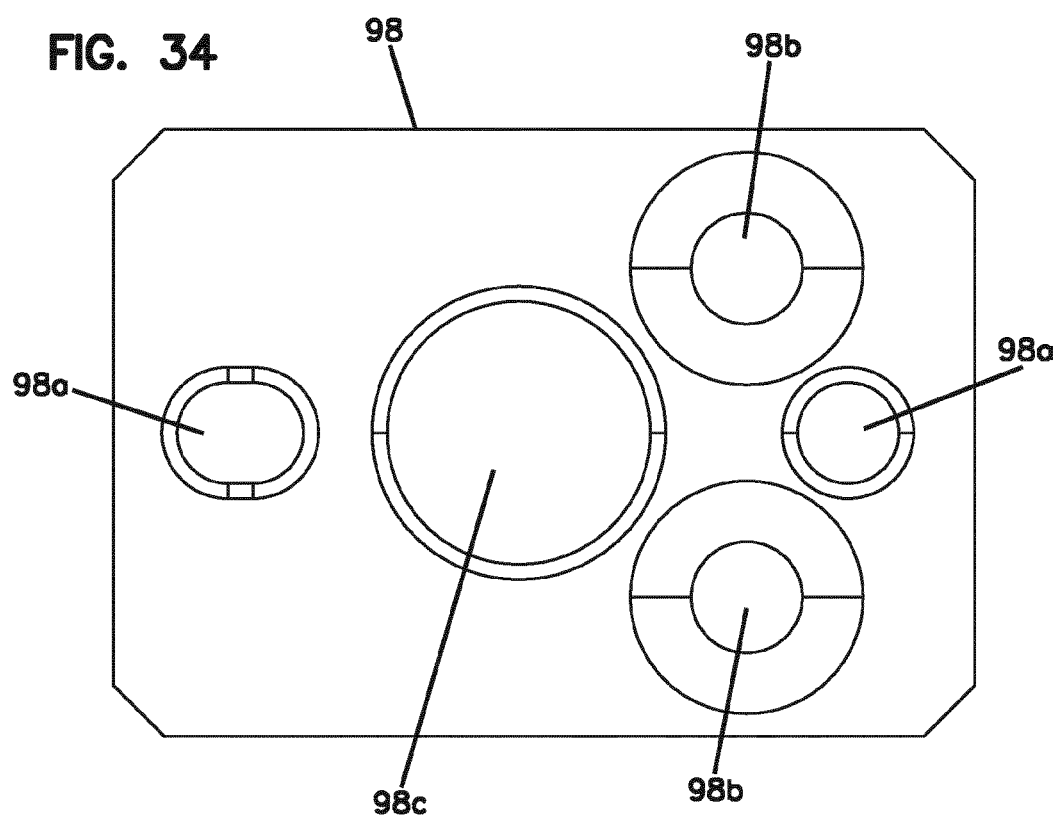
FIG. 34 is a bottom view of the spacer block shown in FIG. 32.
Figure 35:
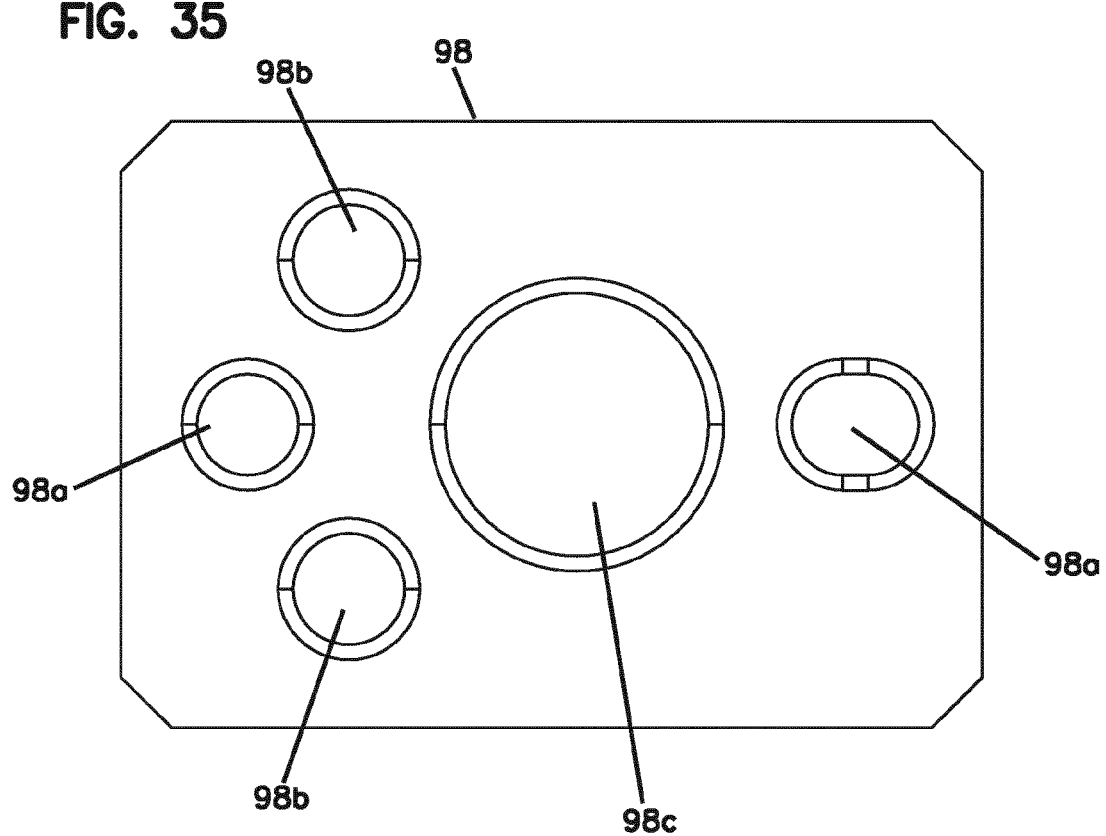
FIG. 35 is a top view of the spacer block shown in FIG. 32
Figure 36:
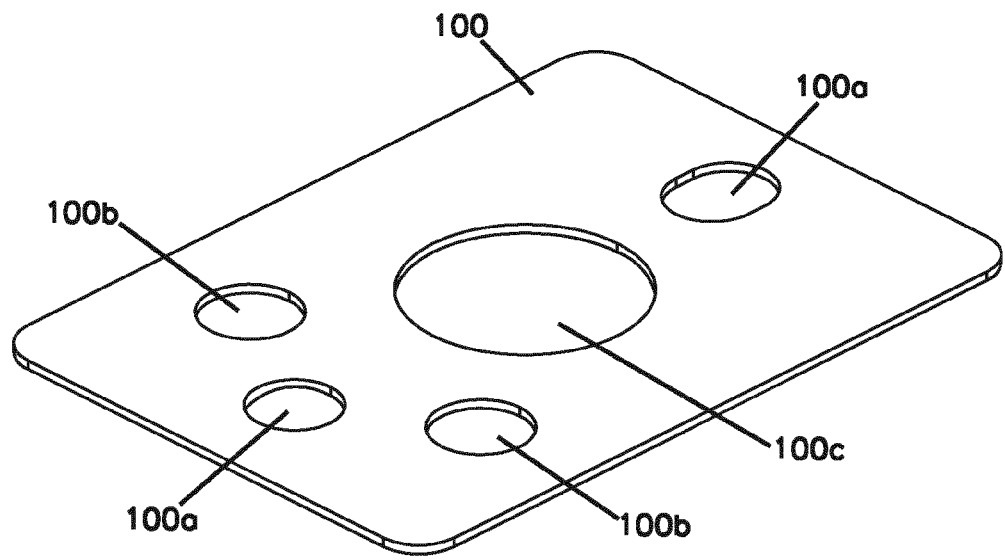
FIG. 36 is a perspective view of a shim piece of the clamping device shown in FIG. 3.
Figure 37:
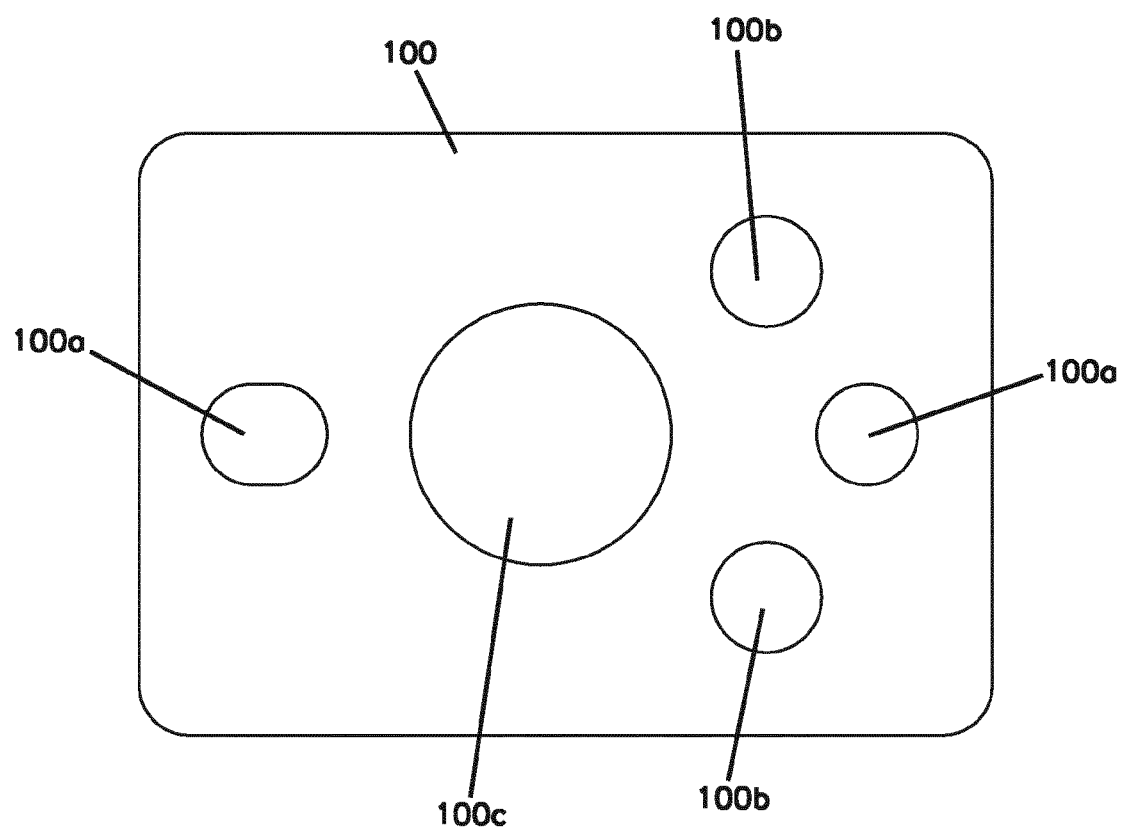
FIG. 37 is a top view of the shim piece shown in FIG. 36.

As shown, the clamping assembly 80 includes a pair of leaf springs 92 which are pressed on opposite sides of the optical fiber 10 to generate the required clamping force. An example leaf spring 92 is shown at FIGS. 29-31. In one example, the leaf springs 92 are formed from a metal material, such as stainless steel of spring quality. This material is very flat and has a low roughness (i.e. very smooth surface) to prevent damaging of the fiber during clamping, and is also resistant to undesirable plastic deformation during the clamping process. The leaf springs 92 have a clamping region 92a with a clamping surface 92b and an opposite surface 92c. The clamping region 92a and clamping surface 92b terminates at a sloped or ramped surface 92d which slopes away from the optical fiber 10 to allow for the optical fiber 10 to be more easily between the leaf springs 92.

The leaf springs 92 are secured between a support block 94 and an upper block 96. The support block 94 and upper block 96 are shown in isolation at FIGS. 19-24 respectively. A spacer block 98 and a shim piece 100 are also shown as being disposed between the support block 94 and the bottom leaf spring 92. The spacer block 98 and shim piece 100 are shown in isolation at FIGS. 32-35 and 36-37 respectively. To ensure complete alignment between the leaf springs 92 and the support and upper blocks 94, 96, a pair of alignment pins 102 are provided that extend through apertures 94a in the support block 94, apertures 98a in the spacer block 98, apertures 100a in the shim piece 100, apertures 92e in the leaf springs 92, and apertures 96a in the upper block. The spacer block 98, shim piece 100, leaf springs 92, and upper block 96 are secured together via fasteners 104 which pass through apertures 98b of the spacer block 98, apertures 100b of the shim piece 100, apertures 92f of the leaf springs 92, and into threaded apertures 96b of the upper block 96. The sub-assembly of the spacer block 98, shim piece 100, leaf springs 92, and upper block 96 is then secured to the support block 94 by a fastener 106 which passes through an apertures 96c of the upper block, apertures 92g of the leaf springs 92, aperture 100c of the shim piece 100, aperture 98c of the spacer block 98 and into a threaded aperture 94c of the support block 94. The sub-assembly of the support block 94, spacer block 98, shim piece 100, leaf springs 92, and upper block 96 is secured to a mounting block 108 via fasteners (not shown) extending through apertures 94d of the support block and into threaded apertures 108a of the mounting block 108. In turn, the mounting block 108 is secured to the frame member second portion 82b via fasteners (not shown) extending through apertures 108b of the mounting block into threaded apertures 82 of the frame member 82b.

A spring finger 116 is also provided that passes through apertures 92j of the leaf springs and extends into an aperture 96f of the upper block 96. The spring finger 116 and aperture 96f can be provided with cooperating threads such that the spring finger 116 can be secured to the upper block 96. The spring finger 116 will always give a force towards the bottom or lower leaf spring 92 (i.e. the leaf spring 92 contacted by the clamping block 110, discussed below). When the clamp assembly 80 is closed or in a clamped position, the spring finger 116 is fully compressed. When the clamp assembly 80 is opened, this spring finger 116 will bend the upper leaf spring 92 about 1 mm further open in a direction away from the upper leaf spring 92. This configuration gives the possibility to clean the leaf springs by blowing compressed air.

In one aspect, the clamping assembly 80 additionally includes a clamping block 110 which passes through a guide opening 94e of the support block 94. The clamping block 110 is shown in isolation at FIGS. 19-24. The guide opening 94e and the clamping block 110 are machined to have a close tolerance such that the support block 94 translates within the guide opening 94e in a constrained manner back and forth in directions D2 and D3. The clamping block 110 is provided with a flange portion 110a that is larger than the guide opening 94e such that the position of the clamping block 110 is limited in the direction D2 by the flange portion 110 abutting the support block 94 and is limited in the direction D3 by the flange portion 110a (and other portions of the clamping block) abutting the mounting block 108. With such a configuration, the clamping block 110 would be inserted into the guide opening 94e prior to the support block 94 being mounted to the mounting block 108. The clamping block 110 can be biased in the direction D2 by a spring 112 located between the clamping block 110 and the mounting block 108. As shown, an actuator 114, such as an electric voice coil, can move the clamping block 110 in the direction D3 by overcoming the force of the spring 112. As shown, the actuator 114 is mounted to the mounting block 108 and includes a shaft 114a that extends through an aperture 108c in the mounting block 108 and into an aperture 110b of the clamping block 110. The shaft 114a and aperture 110b can be threaded to connect the shaft 114a with the clamping block 110. Other means of attachment, such as a through-pin, can be utilized. The presented configuration shows a clamping mechanism 90 in which the spring 112 places the clamping mechanism 90 in a normally clamped position, meaning that the clamping mechanism 90 is in the clamped position when no power is applied to the actuator 114 and that the unclamped position is only achieved when power is applied to the actuator 114. However, the clamping mechanism 90 could be configured such that the clamping mechanism 90 is in a normally unclamped position by operation of a spring acting in an opposite direction and the operation of the actuator 114 generates the clamping force.

Figure 41:
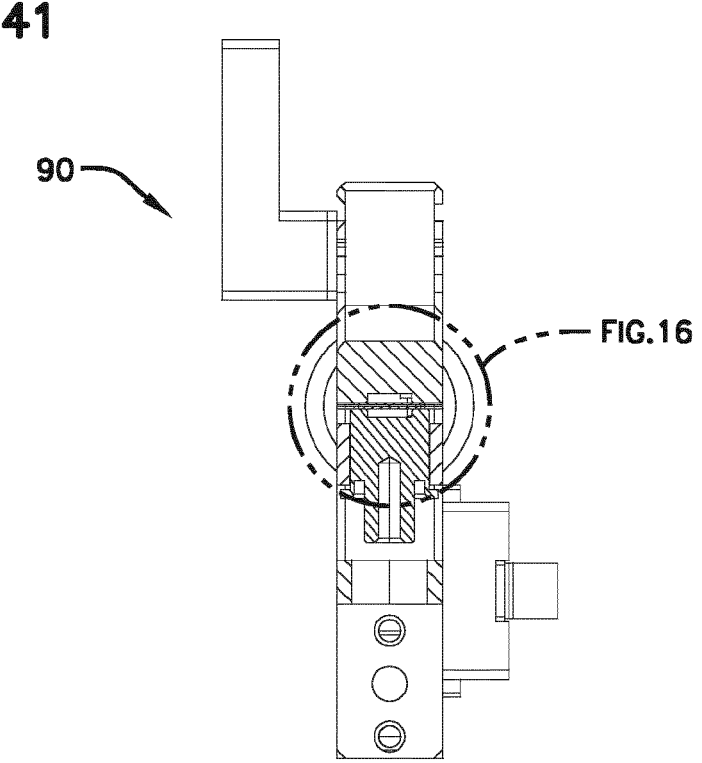
FIG. 41 is a cross-sectional end view of the clamping mechanism shown in FIG. 3.
Figure 42:
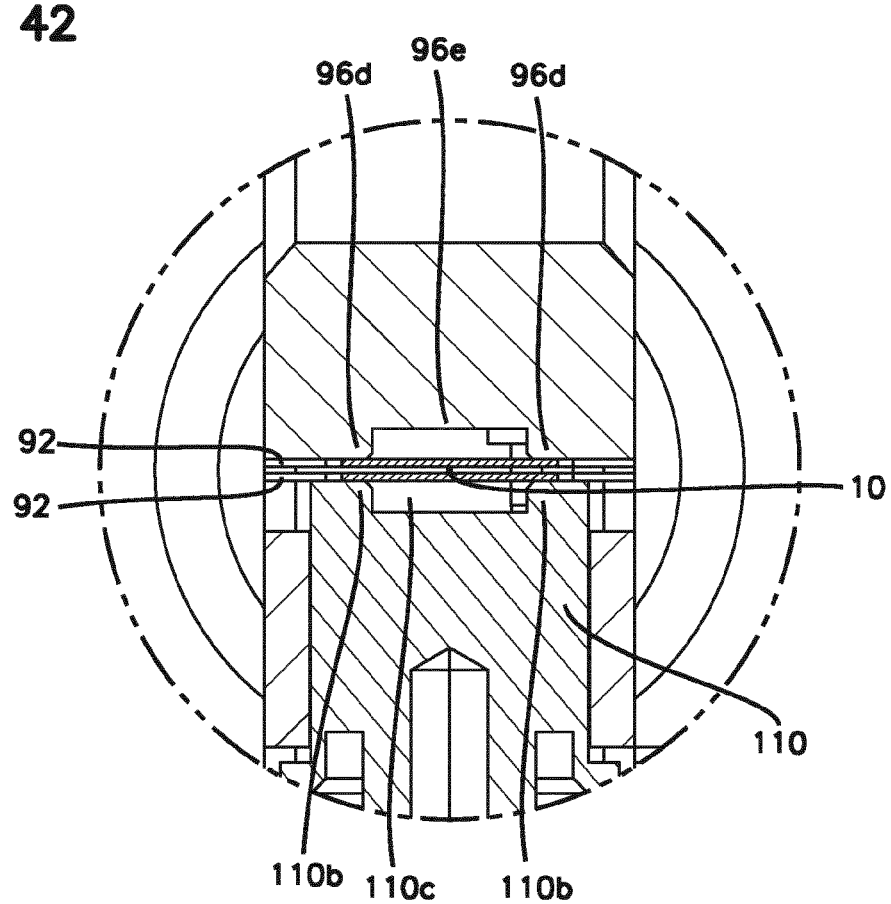
FIG. 42 is an enlarged portion of the view shown in FIG. 41.

In one aspect, the upper block 96 is provided with a pair of contact members 96d separated by a recess area 96e. Similarly, the clamping block 110 is provided with a pair of contact members 110b separated by a recess area 110c. When the clamping assembly is fully assembled, the contact members 96d are in direct contact with the clamping surface 92b of the upper leaf spring 92 while the contact members 110b are in direct contact with the clamping surface 92b of the lower leaf spring 92. Accordingly, as the spring 112 biases the clamping block 110 in the direction D2 a clamping force F1 is generated to press the leaf springs 92 together against the optical fiber, as can be seen at FIGS. 41 and 42, and schematically at FIG. 43. The upper block 96 and clamping block 110 may be more generically referred to as a first clamping member 96 and a second clamping member 110.

Figure 17:
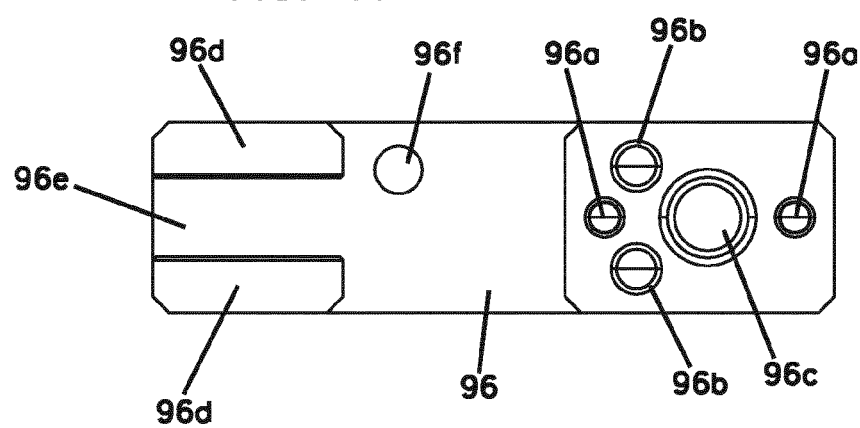
FIG. 17 is a bottom view of the upper block shown in FIG. 13.
Figure 18:
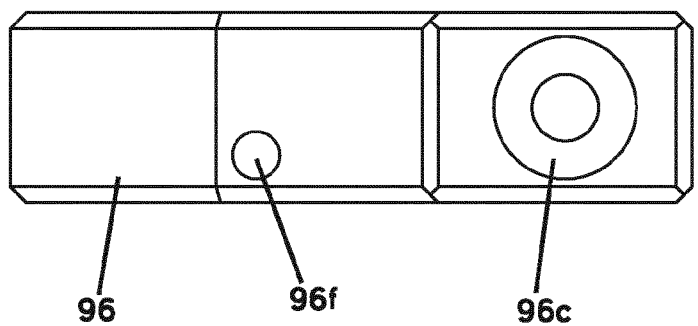
FIG. 18 is a top view of the upper block shown in FIG. 13.
Figure 19:
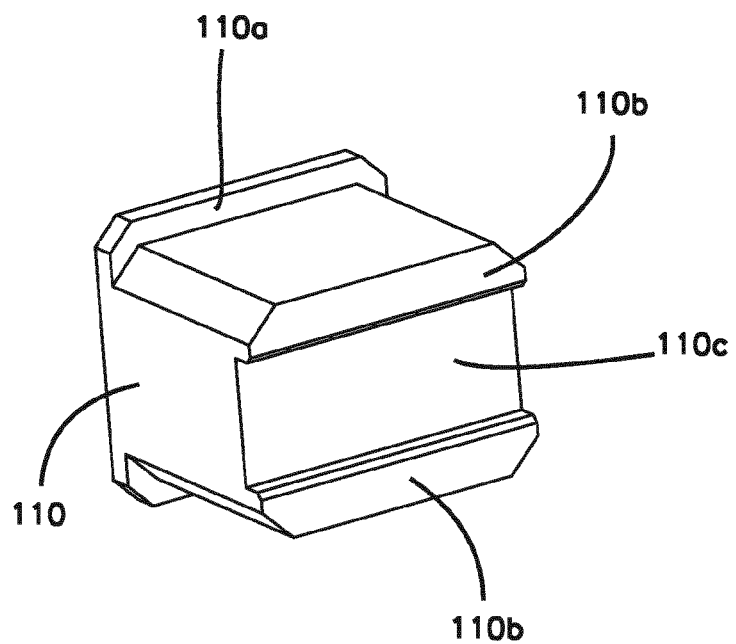
FIG. 19 is a perspective view of a lower block of the clamping mechanism shown in FIG. 3.
Figure 20:
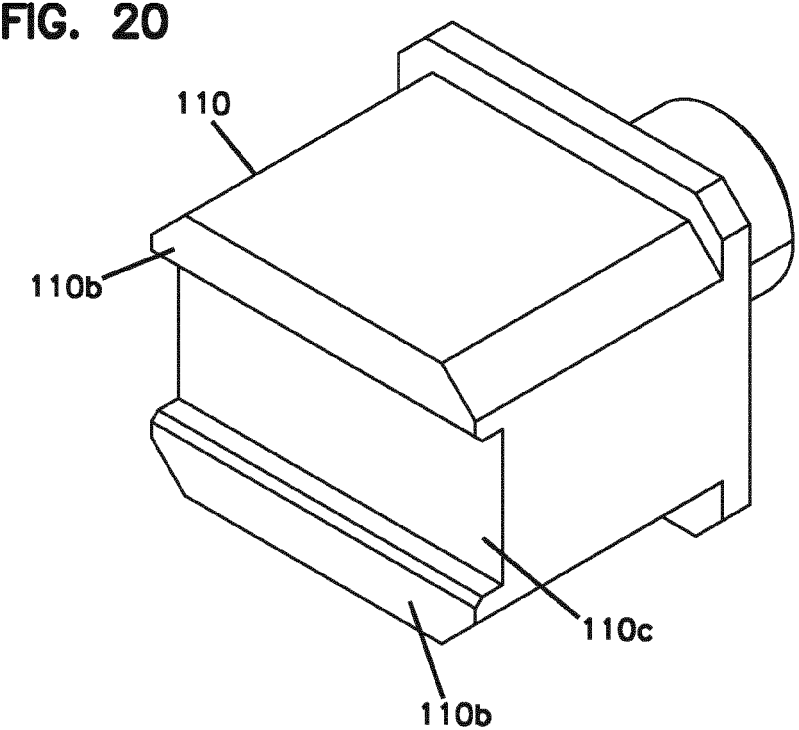
FIG. 20 is a top perspective view of the lower block shown in FIG. 19.
Figure 21:
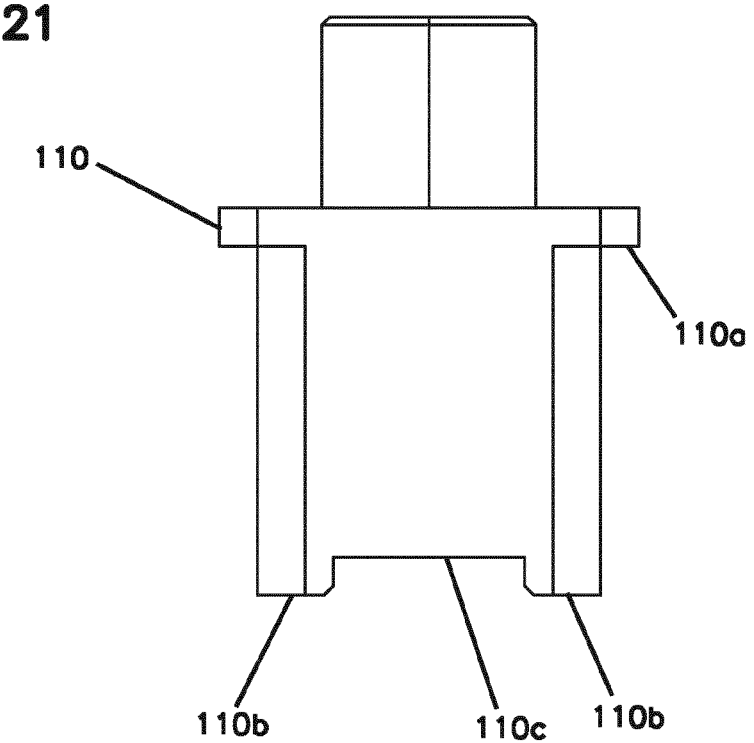
FIG. 21 is an end view of the lower block shown in FIG. 19.
Figure 22:
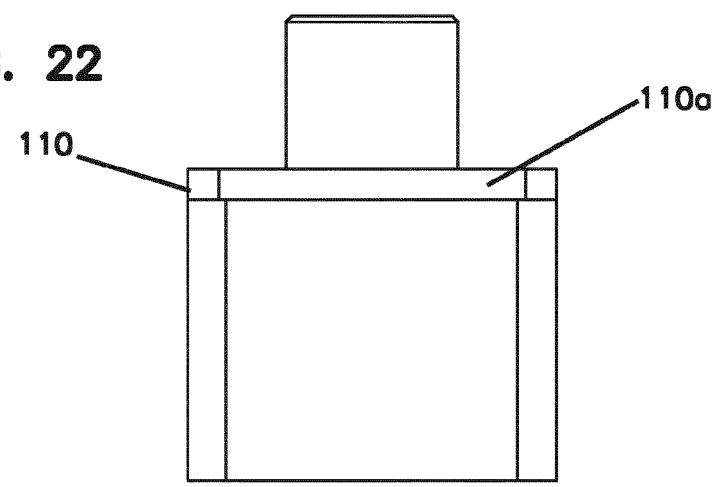
FIG. 22 is a side view of the lower block shown in FIG. 19.
Figure 23:
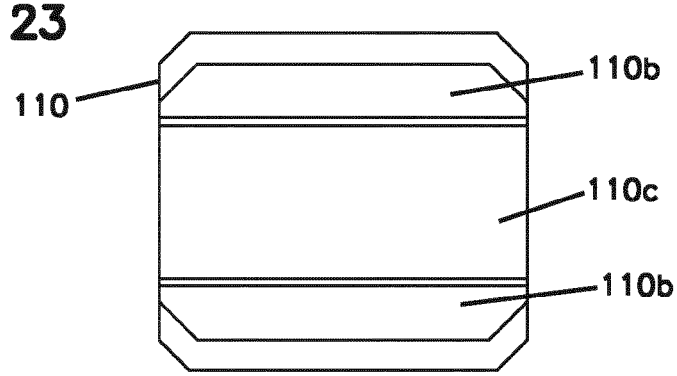
FIG. 23 is a top view of the lower block shown in FIG. 19.
Figure 24:
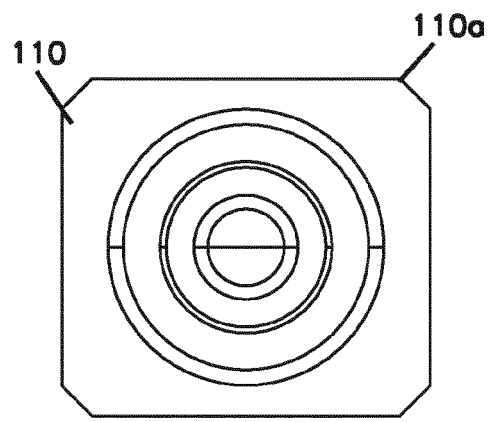
FIG. 24 is a bottom view of the lower block shown in FIG. 19.
Figure 25:
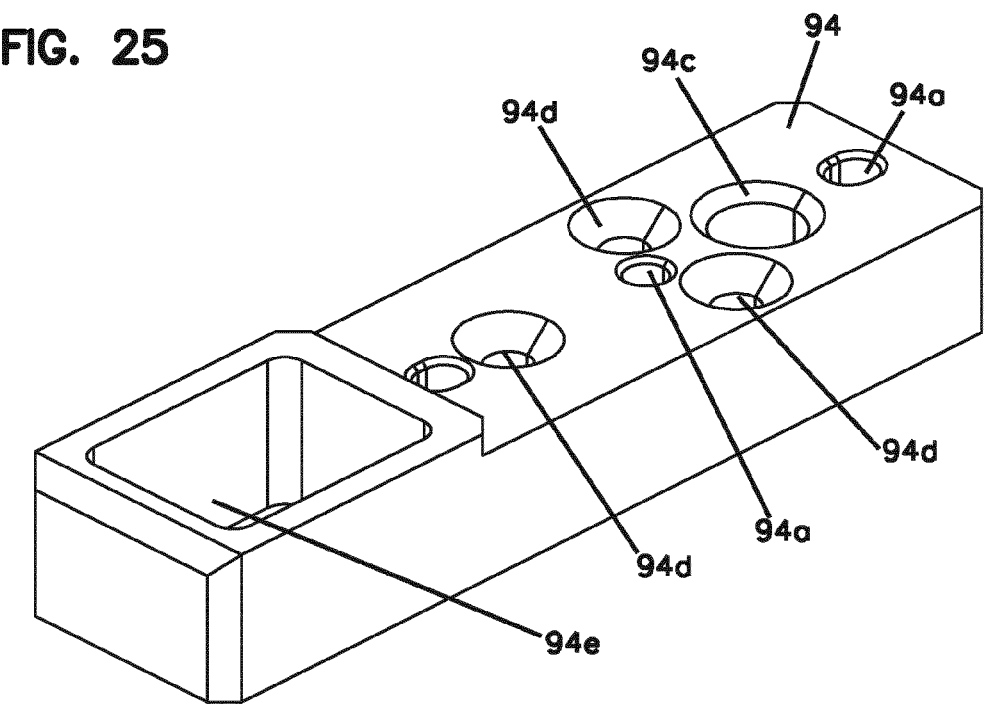
FIG. 25 is a perspective view of a support block of the clamping mechanism shown in FIG. 3.
Figure 26:
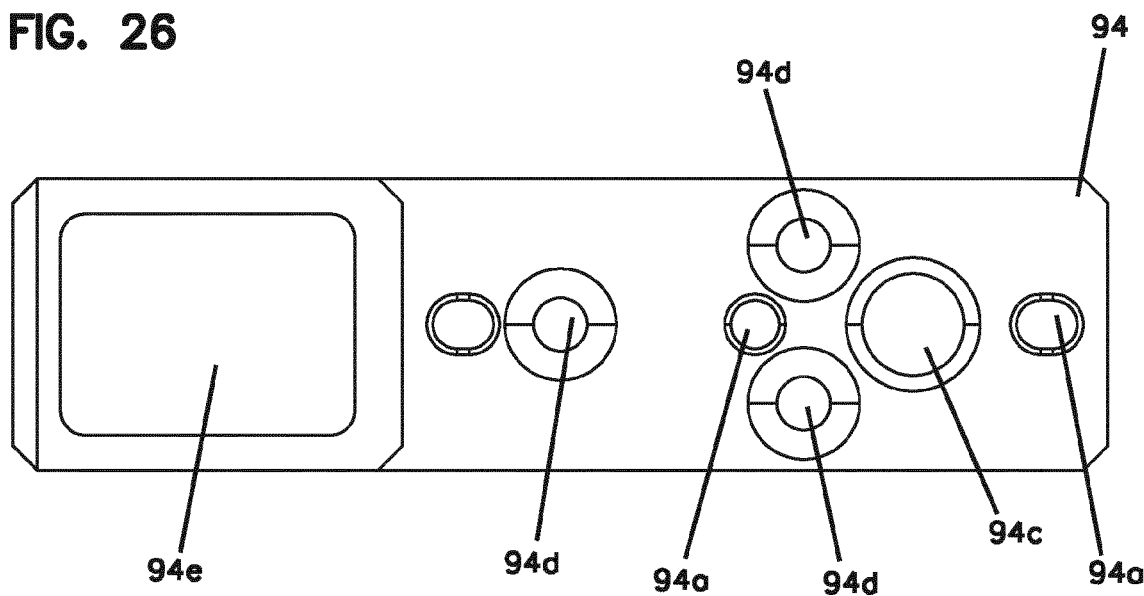
FIG. 26 is a top view of the support block shown in FIG. 25.
Figure 27:
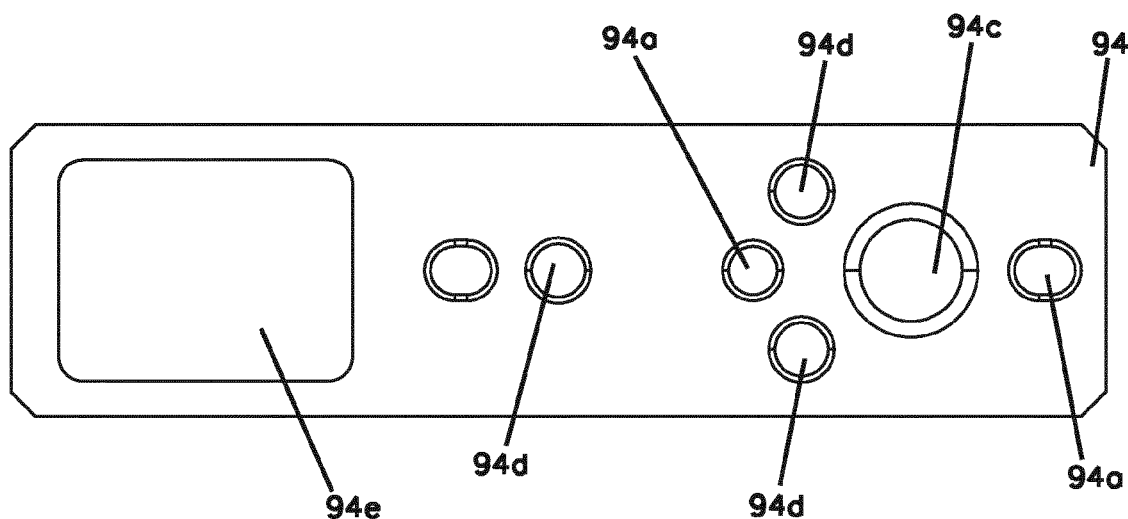
FIG. 27 is a bottom view of the support block shown in FIG. 26.
Figure 28:
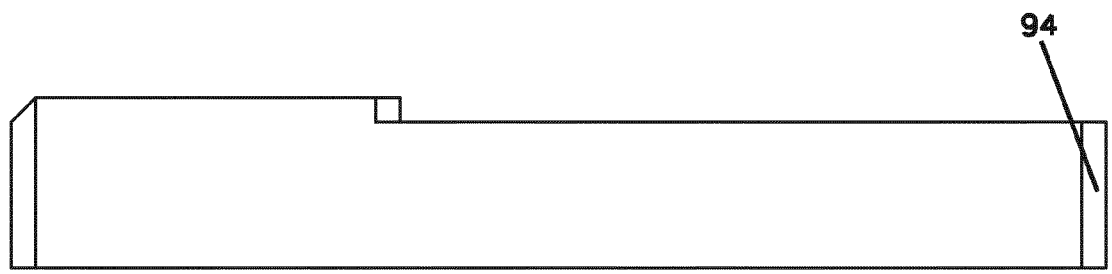
FIG. 28 is a side view of the support block shown in FIG. 25.
Figure 43:
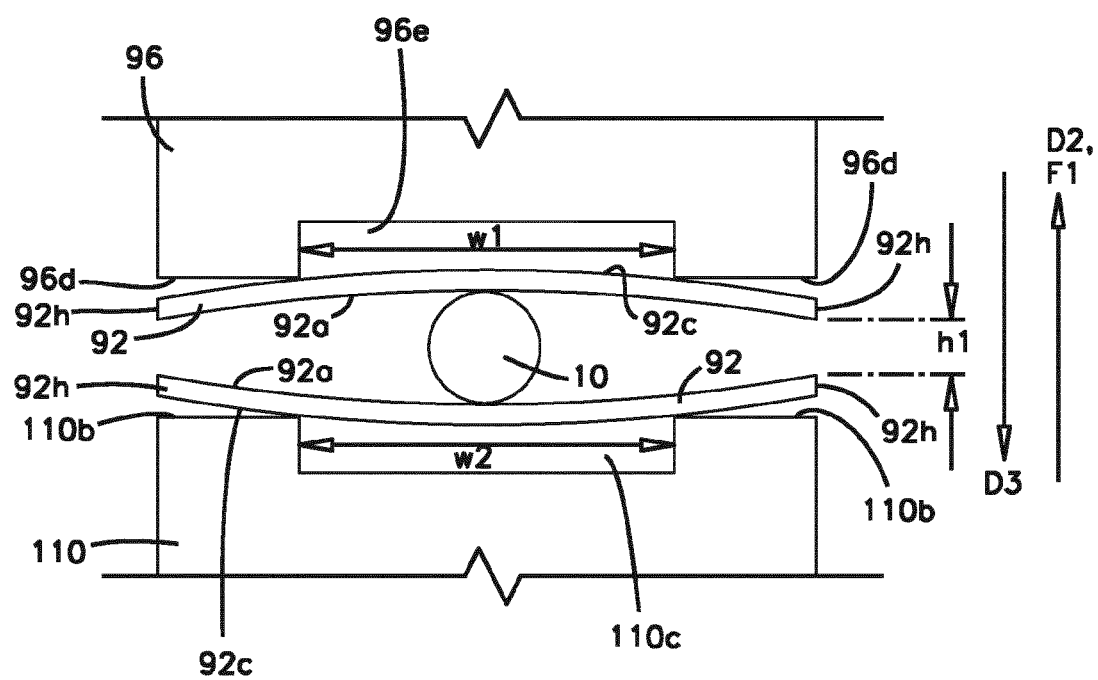
FIG. 43 is a schematic cross-sectional view of the clamping mechanism shown in FIG. 3, showing the first and second clamping components acting on the pair of springs to clamp an optical fiber.

Referring to FIG. 43, the interaction between the clamping block 94, leaf springs 92, and the upper block 96 are shown schematically such that the advantageous operation of the clamping assembly 80 is fully illustrated. As can be seen, the recess areas 96e and 110c of the upper block 96 and clamping block 110 have respective widths w1, w2 that are considerably larger than the diameter of the optical fiber 10. In one example, widths w1, w2 are equal. In one example, widths w1, and w2 are about 5 mm and the depth of the recess areas 96e, 110c is about 1 mm. Due to this width, the contact members 96d, 110b contact the leaf springs 92 at transverse locations not aligned with the optical fiber 10. Accordingly, as the clamping force F1 is exerted by the spring 112, the optical fiber 10 contacts the leaf springs 92 at a relative center point and the contact members 96d, 110b contact their respective leaf springs 92 at points laterally offset from the contact point with the optical fiber 10. This action results in the leaf springs bending around the optical fiber 10 such that side edges 92h of the leaf springs 92 are drawn towards each other and the central portion of the leaf springs 92 is allowed to bend into the recessed areas 96e, 110c. In one aspect, the selection of the widths w1, w2 and the overall width of the leaf springs 92 is chosen in a way such that the leaf springs 92 have a maximum curvature while avoiding contact between the ends 92h of one leaf spring 92 with the ends 92h of the other leaf spring 92. As can be seen at FIG. 17, the ends 92h are separated by a distance h1 so that the leaf springs 92 are not brought into contact with each other.

The bending action of the leaf springs 92 substantially prevents torque from being applied to the optical fiber 10 by the leaf springs 92. Thus, even though the stripped end portion 16s of the optical fiber 10 is very small in diameter (e.g., 125 μm), even very small movements orthogonal to the translational clamping direction D2, D3 are substantially prevented and substantial axial twisting of the optical fiber 10 by the clamping mechanism 90 is also prevented. Furthermore, as the leaf springs 92 are designed to bend about the length or longitudinal axis of the optical fiber 10 during the clamping process, the clamping surfaces 92b of the leaf springs do not have to be machined perfectly flat as with prior art systems having no such bending action. Where an optical fiber 10 is clamped between two rigid members, the surfaces against the optical fiber 10 must be machined without imperfections otherwise the imperfections can damage the optical fiber 10. Machining clamping surfaces to have such a high degree of flatness is time consuming and thus costly. With bending of the leaf springs 92 of the disclosure, such surface imperfections will not damage the optical fiber 10 during clamping. Accordingly, the leaf springs 92 of the disclosure can be provided at a lower cost, as compared to prior art designs.

As there is no substantial axial twisting of the optical fiber 10, no substantial torsional stresses are developed along the optical fiber 10, the optical fiber 10 is not substantially rotationally out of the nominal position, and the optical fiber 10 is not substantially translationally out of the nominal position. With substantially no induced torsional stresses present when the optical fiber 10 is cleaved, the cleaved end 12 of the optical fiber 10 may be substantially free of defects, imperfections, etc. that are caused by torsional stresses. In addition, as the torsional stresses do not substantially vary from a first cleaving operation to a second cleaving operation, the cleaved end 12 of the optical fiber 10 does not include substantial variations that are caused by variations in torsional stresses. As the optical fiber 10 is not substantially rotationally out of position when the optical fiber 10 is cleaved, the cleaved end 12 of the optical fiber 10 may be substantially free of defects, imperfections, etc. caused by the optical fiber 10 being rotationally out of position. In addition, as the optical fiber 10 is not substantially rotationally out of position at various positions of various cleaving operations, the cleaved end 12 of the optical fiber 10 does not include substantial variations that are caused by variability of the rotational position of the optical fiber 10. As the optical fiber 10 is not substantially translationally out of position when the optical fiber 10 is cleaved, the cleaved end 12 of the optical fiber 10 does not include substantial defects, imperfections, etc. that are caused by the optical fiber 10 being translationally out of position. In addition, as the optical fiber 10 is not substantially translationally out of position at various positions of various cleaving operations, the cleaved end 12 of the optical fiber 10 does not include substantial variations caused by the variability of the translational position of the optical fiber 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

PARTS LIST $\alpha$ cleaving angle
$\alpha_F$ cleaving angles
$\alpha_T$ cleaving angles
A axis D_C translational clamping direction
F tensioning force
F_C clamping force
F1 spring force, clamping force
h1 distance
L_C distance
L_F length
M movement
w1 width
w2 width
10 optical fiber
10f optical fiber
10t optical fiber
11 rolling surface
12 cleaved end
12f cleaved end
12t cleaved end
14 protective coating
16 end portion
16s stripped end portion
18 fiber optic cable
20 cleaving mechanism
40 fixture
60 cleave tool
80 clamp assembly
82 frame member
82a first portion
82b second portion
82c flexible portions
84 mounting member
86 actuator
88 sensor
88a first member
88b sensing member
88c mounting member
90 clamping mechanism
92 leaf springs
92a clamping region
92b clamping surface
92c surface
92d ramped surface
92e apertures
92f apertures
92g apertures
92h side edges
92j apertures
94 clamping block
94a apertures
94c threaded aperture
94d apertures
94e guide opening
96 first clamping member, upper block
96a apertures
96b threaded apertures
96c apertures
96d contact members
96e recess area
96f aperture
98 spacer block
98a apertures
98b apertures
98c aperture
100 shim piece
100a apertures
100b apertures
100c aperture
102 alignment pins
104 fasteners
106 fastener
108 mounting block
108a threaded apertures
108b apertures
108c aperture
110 clamping block, second clamping member
110a flange portion
110b aperture
110b contact members
110c recess area
112 spring
114 actuator
114a shaft
116 spring finger
120 vision system
122 tensioner

What is claimed is:

1. A clamping assembly for use in an optical fiber cleaving system, the clamping assembly comprising:
   a frame;
   a clamping mechanism mounted to the frame, the clamping mechanism including:
      a pair of oppositely facing leaf springs between which an optical fiber can be clamped;
      a first clamping member in contact with one of the leaf springs;
      a second clamping member in contact with the other of the leaf springs;
      wherein when a clamping force is applied to one or both of the first and second clamping members, the leaf springs contact the optical fiber and bend about the optical fiber.

2. The clamping assembly of claim 1, further comprising:
   a spring for biasing the second clamping member towards the first clamping member to generate the clamping force and to place the clamping mechanism in a clamped position.

3. The clamping assembly of claim 1, further comprising:
   an actuator for retracting the second clamping member away from the first clamping member to place the clamping mechanism in an unclamped position.

4. The clamping assembly of claim 3, wherein the actuator is a voice coil.

5. The clamping assembly of claim 1, wherein the first and second clamping members each define a pair of contact members separated by a recess area.

6. The clamping assembly of claim 5, wherein the recess areas each have a width that is greater than a diameter of the optical fiber.

7. The clamping assembly of claim 1, wherein the first clamping member is held in a rigid position and the second clamping member is movable to place the clamping mechanism in either a clamped position or an unclamped position.

8. The clamping assembly of claim 7, wherein the second clamping member is received by and translates within an aperture of a support block.

9. The clamping assembly of claim 8, wherein the support block is rigidly connected to the first clamping member.

10. The clamping assembly of claim 9, wherein the support block and the first clamping member are aligned together by at least two alignment pins.

11. The clamping assembly of claim 1, wherein the frame includes a first part and a second part flexibly connected to the first part.

12. The clamping assembly of claim 11, wherein the clamping mechanism is rigidly mounted to the second part and the first part is rigidly mounted to another structure.

13. The clamping assembly of claim 11, further comprising:
an actuator extending between the first and second parts, wherein when the actuator is actuated, the second part and the clamping mechanism are moved relative to the first part.

14. The clamping assembly of claim 13, further including a sensor for measuring a distance that the first part is moved relative to the second part by the actuator.

15. A clamping mechanism for use in an optical fiber cleaving system, the clamping mechanism comprising:
a pair of deflectable members between which an optical fiber can be clamped, the pair of deflectable members extending along a longitudinal axis; and
a pair of clamping members in contact with the pair of deflectable members;
wherein when a clamping force is applied to one or both of the deflectable members, the deflectable members contact the optical fiber and deflect about the optical fiber and in a direction parallel to the longitudinal axis;
wherein at least one of the clamping members is actuated by an actuator to generate a clamping force between the pair of deflectable members.

16. The clamping mechanism of claim 15, wherein the deflectable members are leaf springs.

17. The clamping mechanism of claim 15, wherein each of the clamping members has a pair of contact members separated by a central recess, the contact members being in surface contact with the deflectable members.

18. The clamping mechanism of claim 15, further including a biasing member generating a biasing force to separate the pair of deflectable members.

* * * * *